(12) United States Patent
Becker et al.

(10) Patent No.: US 6,983,757 B1
(45) Date of Patent: Jan. 10, 2006

(54) PRESSURE DIFFERENTIAL DISTRIBUTION SYSTEM

(75) Inventors: Brian E. Becker, Littleton, CO (US); Matthew L. Becker, Littleton, CO (US); Carl D. Becker, Evergreen, CO (US); Ryan M. Becker, Littleton, CO (US)

(73) Assignee: Ascent Systems, Inc., Littleton, CO (US)

( * ) Notice: Subject to any disclaimer, the term of this patent is extended or adjusted under 35 U.S.C. 154(b) by 251 days.

(21) Appl. No.: 10/110,646

(22) PCT Filed: Aug. 24, 2000

(86) PCT No.: PCT/US00/23269

§ 371 (c)(1),
(2), (4) Date: Jul. 11, 2002

(87) PCT Pub. No.: WO01/27582

PCT Pub. Date: Apr. 19, 2001

Related U.S. Application Data

(60) Provisional application No. 60/159,265, filed on Oct. 13, 1999.

(51) Int. Cl.
*B67D 5/08* (2006.01)

(52) U.S. Cl. .............. 137/14; 137/565.16; 137/565.23; 138/107; 138/121; 454/63; 454/65

(58) Field of Classification Search .......... 137/355.16, 137/565.23, 14; 138/107, 121; 454/63, 454/65
See application file for complete search history.

(56) References Cited

U.S. PATENT DOCUMENTS

| | | | |
|---|---|---|---|
| 3,115,898 A | 12/1963 | Rothermel | 138/122 |
| 3,200,765 A | 8/1965 | Ambli | 104/52 |
| 3,911,944 A | 10/1975 | Hukuba et al. | 137/355.2 |
| 4,009,734 A | 3/1977 | Sullivan | 138/125 |
| 4,086,847 A | 5/1978 | Overmeyer | 98/115 M |
| 4,231,595 A * | 11/1980 | Knutsen | 285/38 |
| 4,343,420 A | 8/1982 | Scott | 226/49 |
| 4,903,911 A | 2/1990 | Sepka | 242/86 |
| 5,023,959 A * | 6/1991 | Mercer | 4/321 |
| 5,092,228 A * | 3/1992 | Pfeiffer et al. | 454/63 |
| 5,096,230 A | 3/1992 | Pausch et al. | 285/9.1 |
| 5,119,843 A | 6/1992 | Keenan | 137/355.23 |
| 5,156,349 A | 10/1992 | Wilson et al. | 242/47.5 |
| 5,162,017 A | 11/1992 | Nordin | 454/63 |

(Continued)

FOREIGN PATENT DOCUMENTS

GB    WO 03/02494 A1 *  3/2003

(Continued)

OTHER PUBLICATIONS

Aero-Motive Company, Balancer Series 10F, 15F, 10FLR & 15 FLR Service Manual, May 1997, pp. 1-2.

(Continued)

*Primary Examiner*—A. Michael Chambers
(74) *Attorney, Agent, or Firm*—Santangelo Law Offices, P.C.

(57) ABSTRACT

An pressure differential distribution system which offers an pressure differential reaction element (1) made of a comfortable, flexible pressure differential interface (2) that is attached to a support element (3), which in conjunction with a difference in pressure between the interior volume of the differential reaction element (1) can conform to various extended or reduced conformers. The flexible pressure differential interface (2) may retract within an enclosure(4). An emission removal adaptor (12) or terminal interface (23) may be coupled to a substance source (10) to capture or move substances on a pressure differential from a first zone to a second zone.

60 Claims, 15 Drawing Sheets

U.S. PATENT DOCUMENTS

| | | | | |
|---|---|---|---|---|
| 5,224,739 | A | | 7/1993 | Sauter .......................... 285/41 |
| 5,362,273 | A | | 11/1994 | Pfeiffer, Jr. et al. ............ 454/63 |
| 5,402,551 | A | | 4/1995 | Workhoven et al. .......... 15/315 |
| 5,453,048 | A | | 9/1995 | Zima et al. .................... 454/63 |
| 5,470,176 | A | * | 11/1995 | Corcoran et al. ............. 404/72 |
| 5,482,089 | A | | 1/1996 | Weber et al. ................ 138/122 |
| 5,536,206 | A | * | 7/1996 | Bodmer et al. ................ 454/65 |
| 5,607,107 | A | | 3/1997 | Grieve, Jr. ................... 239/195 |
| 5,679,072 | A | | 10/1997 | Brodin et al. .................. 454/63 |
| 5,738,148 | A | * | 4/1998 | Coral et al. .................. 138/120 |
| 5,791,980 | A | | 8/1998 | Kramer, Jr. ................... 454/64 |
| 6,012,978 | A | | 1/2000 | Svensson et al. ............. 454/63 |
| 6,139,422 | A | * | 10/2000 | Blaschke ...................... 454/63 |
| 6,607,009 | B2 | * | 8/2003 | Schoellhorn et al. ........ 137/899 |

FOREIGN PATENT DOCUMENTS

| | | |
|---|---|---|
| WO | WO 01/27582 | 4/2001 |

OTHER PUBLICATIONS

Ammerman, Inc., Underfloor Automative Exhaust Systems, Nos. 400, 601, 700, 1000-5, and 1000-6, p. 2.
Banzai, Exhaust Hose Reels, Cover Picture; Nederman, Inc., Spring-Loaded Exhaust Hose Reels, p. 2.
Carmon Products, Inc., Car-mon Tubing Storage Reel Drawing No. 85-R1, p. 1.
Carmon Products, Inc., Carmon Rotoboom, RotoBoom, Drawing No. 79D5; Tykron, Inc., Swing Arm with Hose and Balancer, p. 1.
Carmon Products, Inc., Carmon Tube Assemblies, Drawing No. 86-D1, p. 1.
Carmon Products, Inc., Sales Brochure, Carmon Tube Assemblies, Drawing No. 86-D1, p. 1.
Carmon Products, Inc., Carmon RotoBoom, Rotoboom Drawing No. 79D5; and Ammerman, Inc., Underfloor Automotive Exhaust Systems, p. 2.
Carmon Products, Inc., Carmon Overhead Disappearing Exhaust System, Drawing No. 86-D3; Cesco-Advanced Air, Flexible Tubing, Drawing No. F558-305A 11/25, p. 1, (1980).
Cesco-Advanced Air, Flexible Tubing, Drawing F558-305A 11/25, p. (1980).
Cesco-Advanced Air, Sales Brochure, Underfloor Disappearing with Vitrified Clay Pipe, Drawing No. F551-305A378, p. 1 (1978).
Euro-Roller, Cover Picture; Fumex, Hose Reel For Exhaust Extraction, Hose Reel, Part No. SR 10, p. 1.
Harvey Corp., Carbon Moxoide Exhaust Removal System, Harvey Components and Accessories, p. 2.
Harvey Corp., Carbon Monoxide Removal System, Harvey Components and Accessories, p. 2.
Harvey Inc., Carbon Monoxide Exhaust Removal System, Harvey Overhead Exhaust System, p. 6.
Harvey Inc., Carbon Monoxide Exhaust Removal System, Harvey Hose and Tubing, Part H-40-20-AF or H-50-12- AF, p. 9.
Monoxivent Systems Inc., Technical Information Sheet, Vehicle Exhaust Damper, Series TCA, p. 3-A.
Monoxivent Systems Inc., Tailpipe Adapter Order Form, p. 1; Nederman Inc., Nozzles For Vehicle Exhaust Extraction, Nozzles for Trucks and Other Commercial Vehicles, p. 2.
Monoxivent Systems Inc., Technical Information, Vehicle Exhaust Damper, Series TCA, p. 3-A.
Monoxivent Systems Inc., Technical Information, Monoxivent Overhead Systems, p. 4.
Monoxivent Systems Inc., Tailpipe Adapter Order Form, p. 1 Nederman Inc., Overhead Exhaust Extractor, Nederman Simple Exhaust Extractors, p. 2.
Monoxivent Systems Inc., Monoxivent Exhaust Elimination Systems, Hose Assembly Order Form, p. 3.
Monoxivent Systems Inc., Monoxivent Overhead Systems, p. 4.
Nederman Inc., Overhead Exhaust Extractor, Single and Double Extractor Fans, Drawing No. 13-2, p. 2, May 1997.
Nederman Inc., Overhead Exhaust Extractor, Nederman Simple Exhaust Extractors, p. 2, May 1997.
Nederman Inc., Nozzles For Vehicle Exhaust Extraction, Nozzles for Trucks and Other Commercial Vehicles, p. 2.
U.S. Appl. No. 60/261,077, "Self-Positioning Differential Pressure Distribution System", filed on Jan. 11, 2001.
U.S. Appl. No. 60/159,265, "Self-Retracting Emission Removal System", filed Oct. 13, 1999.
U.S. Appl. No. 60/261,469, "Tensioned Differential Pressure Distribution Interface Securement System", filed Jan. 12, 2001.
Sacatec, Inc., Hosereel For Exhaust Extraction, Cover, p. 1.
Sacatec, Inc., Garage Exhaust—Ventilation Systems, Drawing No. SA0286-1, p. 1.
Technical Manual, Exhaust-O-Vent, p. 2 (1985).
Tykron, Inc., Swing Arm with Hose and Balancer, p. 1.
Tykron, Inc., Vehicle Exhaust Gas Control for Removal of Exhaust Fumes, p. 1.
Aero-Motive Company, Balancer Series 10F, 15F, 10FLR & 15 FLR Service Manual, May 1997, pp. 1-2, not later than Oct. 13, 1999.
Ammerman, Inc., Underfloor Automotive Exhaust Systems, Nos. 400, 601, 700, 1000-5, and 1000-6, p. 2, not later than Oct. 13, 1999.
Banzai, Exhaust Hose Reels, Cover Picture; Nederman, Inc., Spring-Loaded Exhaust Hose Reels, p. 2, not later than Oct. 13, 1999.
Carmon Products, Inc., Car-mon Tubing Storage Reel Drawing No. 85-R1, p. 1, not later than Oct. 13, 1999.
Carmon Products, Inc., Carmon Rotoboom, RotoBoom, Drawing No. 79D5; Tykron, Inc., Swing Arm with Hose and Balancer, p. 1, not later than Oct. 13, 1999.
Carmon Products, Inc., Carmon Tube Assemblies, Drawing No. 86-D1, p. 1, not later than Oct. 13, 1999.
Carmon Products, Inc., Sales Brochure, Carmon Tube Assemblies, Drawing No. 86-D1, p. 1, not later than Oct. 13, 1999.
Carmon Products, Inc., Carmon RotoBoom, Rotoboom Drawing No. 79D5; and Ammerman, Inc., Underfloor Automotive Exhaust Systems, p. 2, not later than Oct. 13, 1999.
Carmon Products, Inc., Carmon Overhead Disappearing Exhaust System, Drawing No. 86-D3; Cesco-Advanced Air, Flexible Tubing, Drawing No. F558-305A 11/25, p. 1, (1980).
Cesco-Advanced Air, Flexible Tubing, Drawing F558-305A 11/25, p. 1 (1980).
Cesco-Advanced Air, Sales Brochure, Underfloor Disappearing with Vitrified Clay Pipe, Drawing No. F551-305A378, p. 1 (1978).
Euro-Roller, Cover Picture; Fumex, Hose Reel For Exhaust Extraction, Hose Reel, Part No. SR 10, p. 1, not later than Oct. 13, 1999.
Harvey Corp., Carbon Moxoide Exhaust Removal System, Harvey Components and Accessories, p. 2, not later than Oct. 13, 1999.

Harvey Corp., Carbon Monoxide Removal System, Harvey Components and Accessories, p. 2, not later than Oct. 13, 1999.

Harvey Inc., Carbon Monoxide Exhaust Removal System, Harvey Overhead Exhaust System, p. 6, not later than Oct. 13, 1999.

Harvey Inc., Carbon Monoxide Exhaust Removal System, Harvey Hose and Tubing, Part H-40-20-AF or H-50-12- AF, p. 9, not later than Oct. 13, 1999.

Monoxivent Systems Inc., Technical Information Sheet, Vehicle Exhaust Damper, Series TCA, p. 3-A, not later than Oct. 13, 1999.

Monoxivent Systems Inc., Tailpipe Adapter Order Form, p. 1; Nederman Inc., Nozzles For Vehicle Exhaust Extraction, Nozzles for Trucks and Other Commercial Vehicles, p. 2, not later than oct. 13, 1999.

Monoxivent Systems Inc., Technical Information, Vehicle Exhaust Damper, Series TCA, p. 3-A; not later than Oct. 13, 1999.

Monoxivent Systems Inc., Technical Information, Monoxivent Overhead Systems, p. 4; not later than Oct. 13, 1999.

Monoxivent Systems Inc., Tailpipe Adapter Order Form, p. 1 Nederman Inc., Overhead Exhaust Extractor, Nederman Simple Exhaust Extractors, p. 2, not later than Oct. 13, 1999.

Monoxivent Systems Inc., Monoxivent Exhaust Elimination Systems, Hose Assembly Order Form, p. 3, not later than Oct. 13, 1999.

Monoxivent Systems Inc., Monoxivent Overhead Systems, p. 4, not later than Oct. 13, 1999.

Nederman Inc., Overhead Exhaust Extractor, Single and Double Extractor Fans, Drawing No. 13-2, p. 2, May 1997.

Nederman Inc., Overhead Exhaust Extractor, Nederman Simple Exhaust Extractors, p. 2, May 1997.

Nederman Inc., Nozzles For Vehicle Exhaust Extraction, Nozzles for Trucks and Other Commercial Vehicles, p. 2, not later than Oct. 13, 1999.

U.S. Appl. No. 60/261,077, "Self-Positioning Differential Pressure Distribution System", filed on Jan. 11, 2001.

U.S. Appl. No. 60/159,265, "Self-Retracting Emission Removal System", filed Oct. 13, 1999.

U.S. Appl. No. 60/261,469, "Tensioned Differential Pressure Distribution Interface Securement System", filed Jan. 12, 2001.

Tykron, Inc., Vehicle Exhaust Gas Control for Removal of Exhaust Fumes, p. 1, not later than Oct. 13, 1999.

* cited by examiner

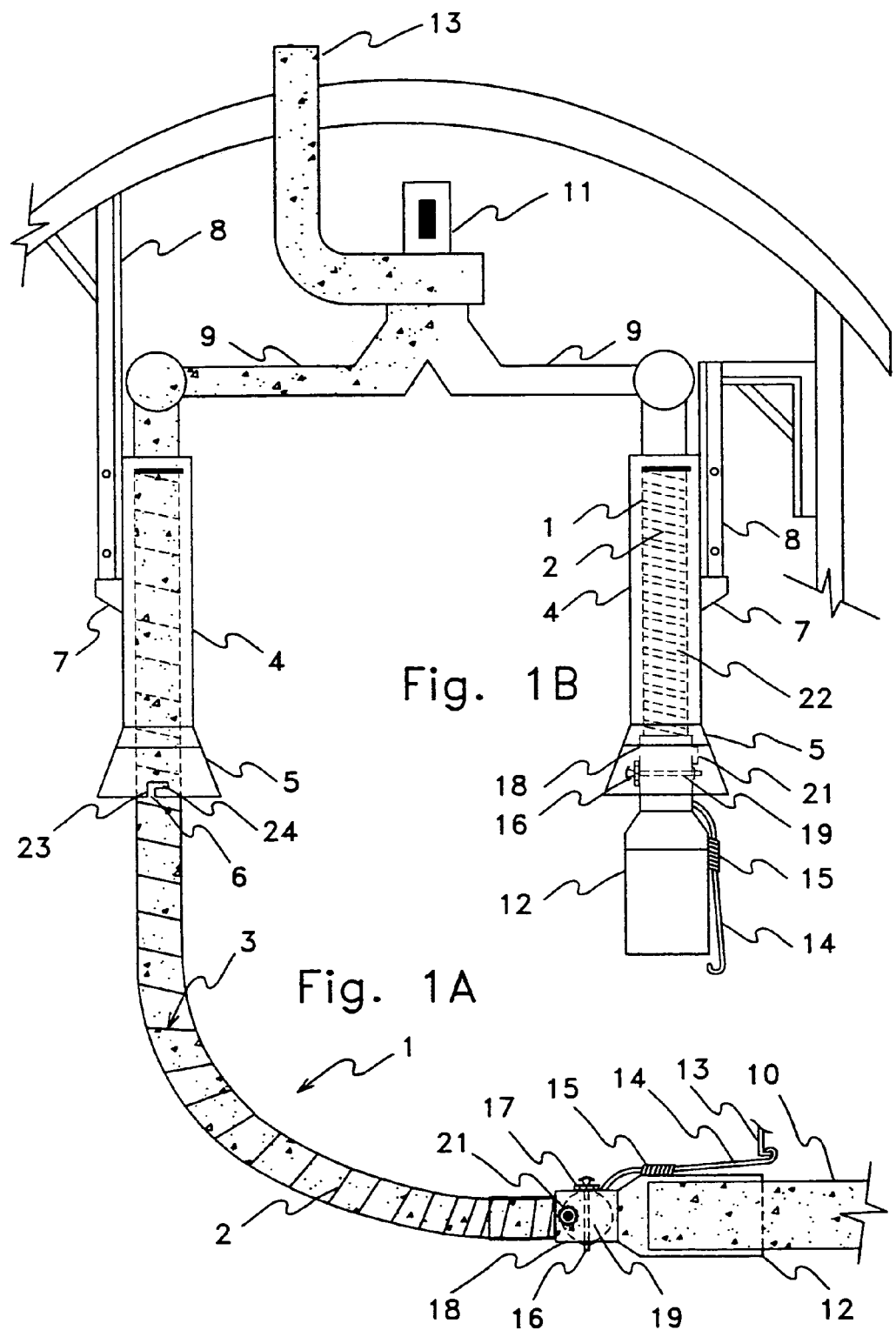

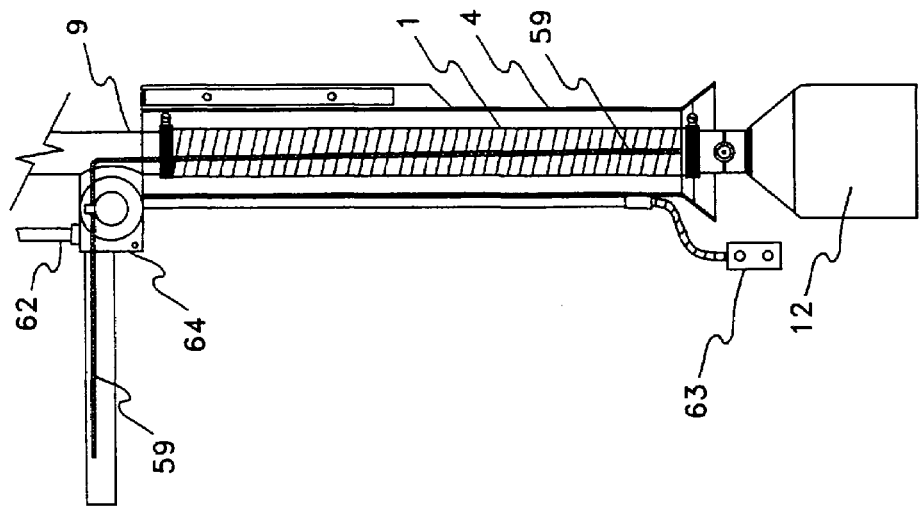
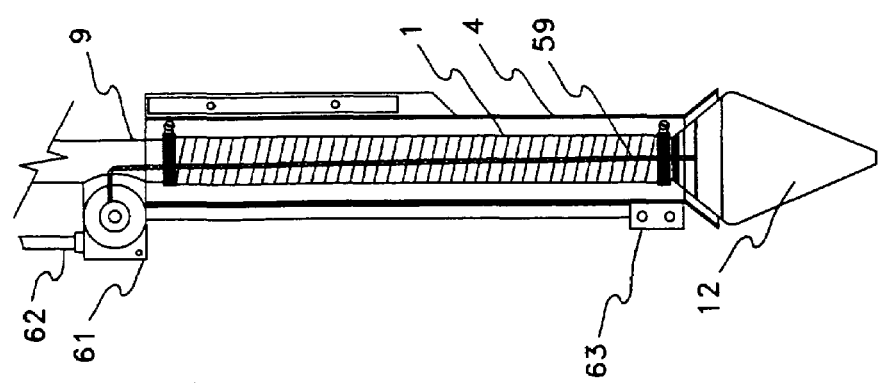
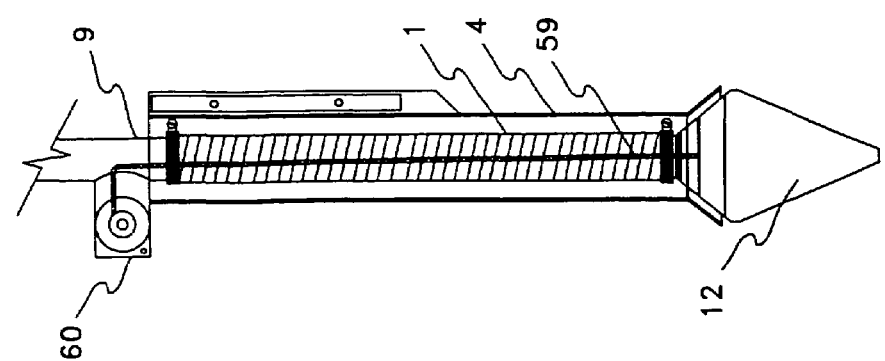

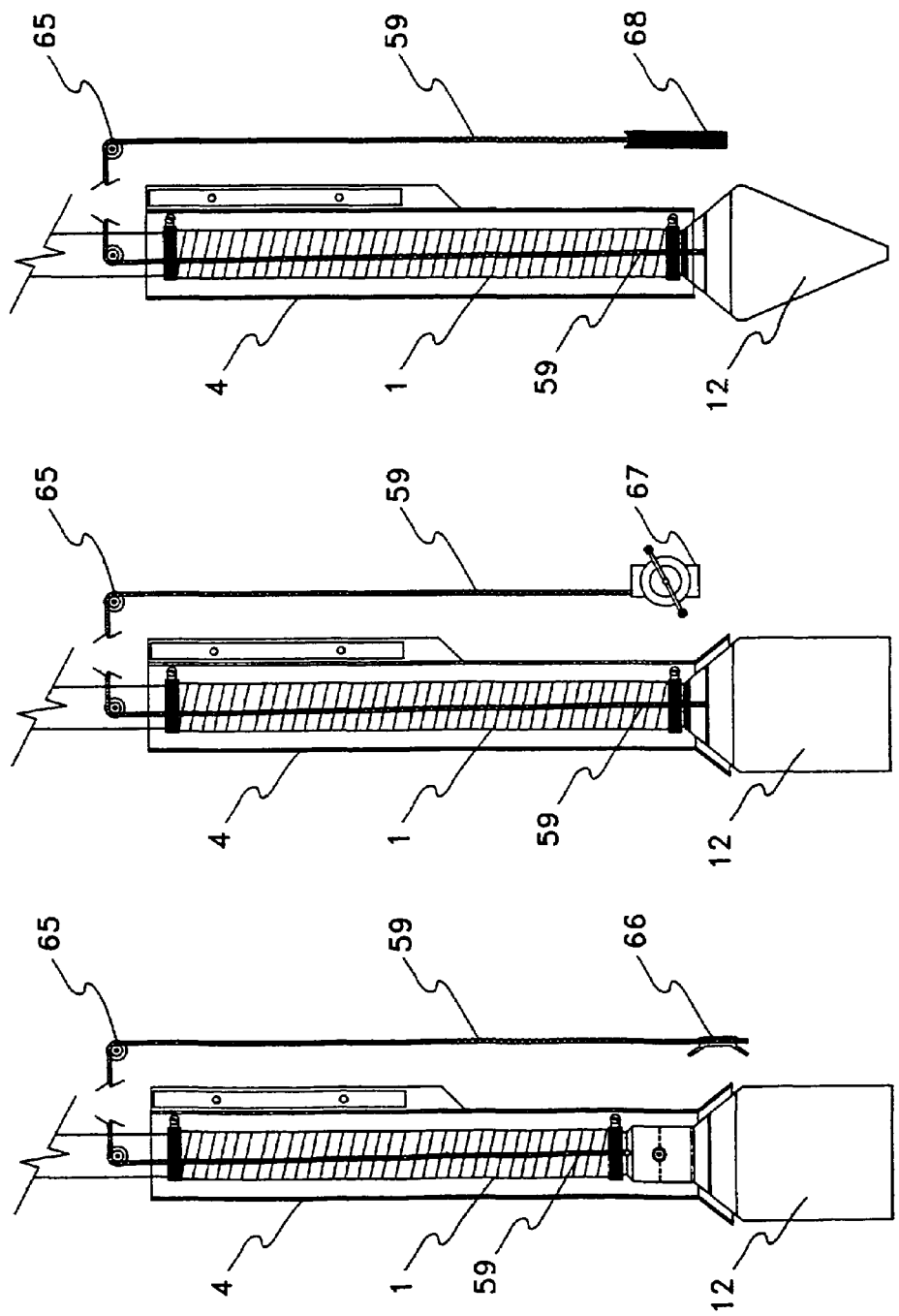

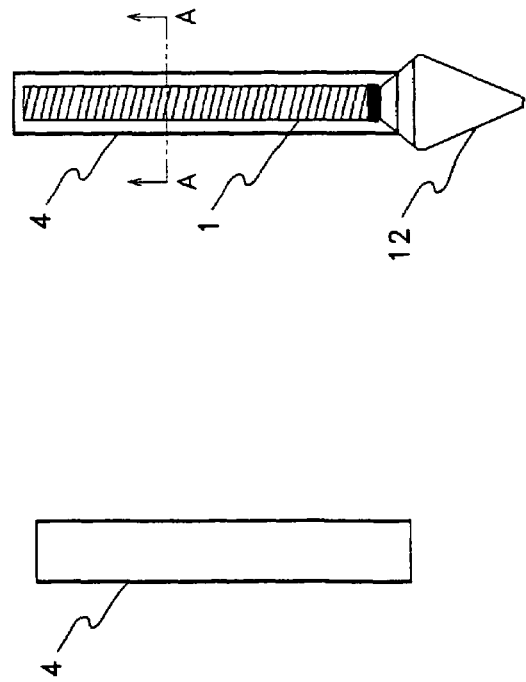
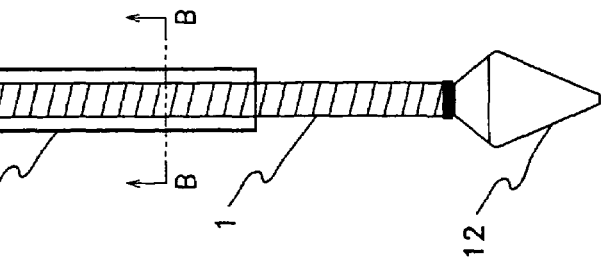

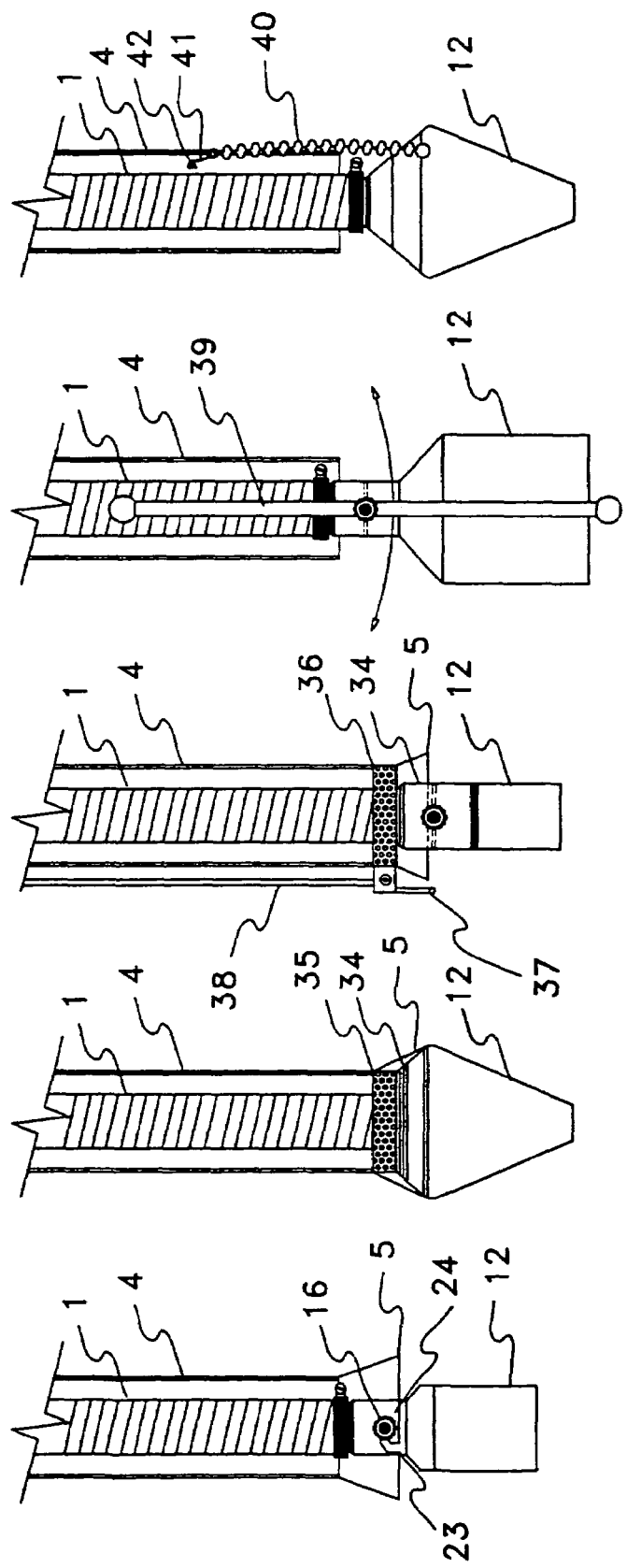

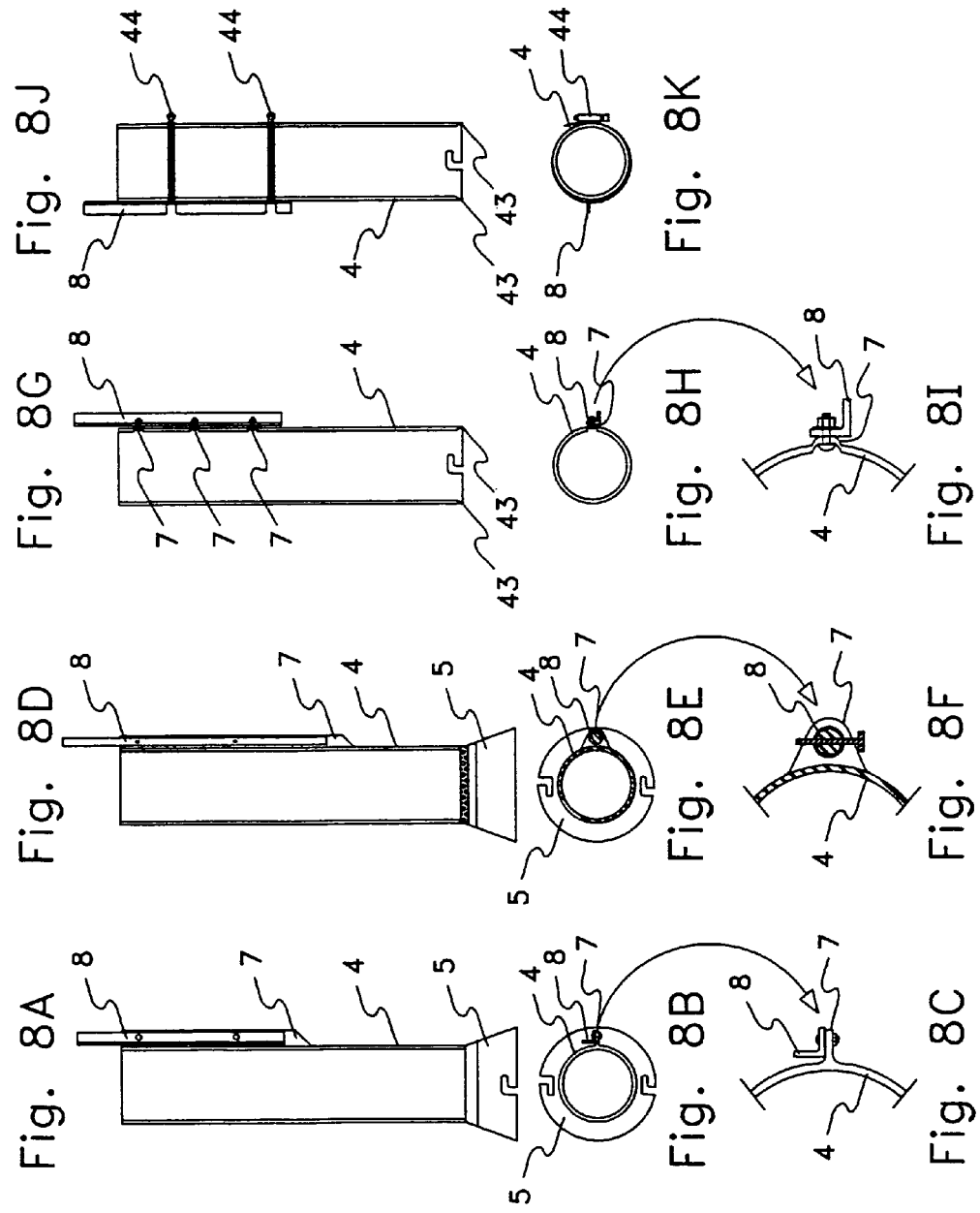

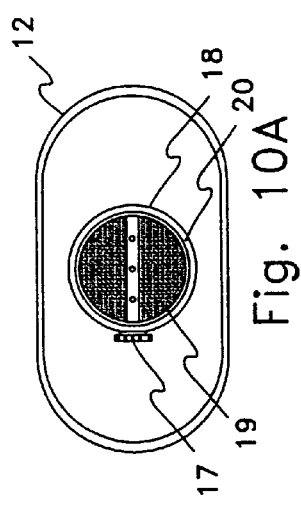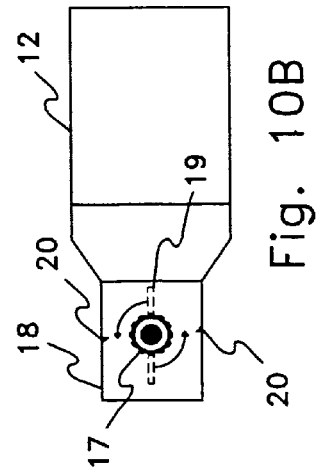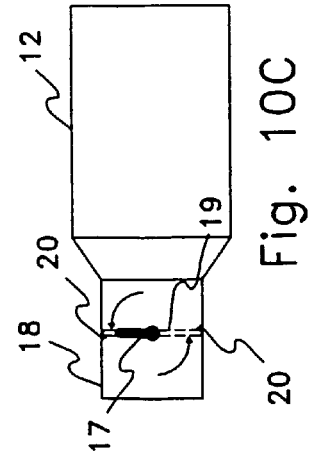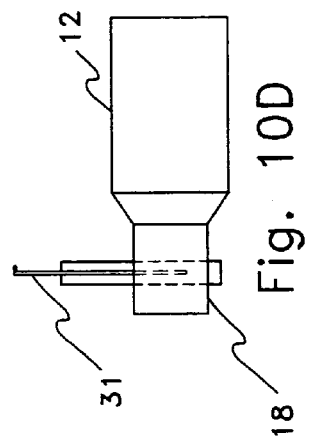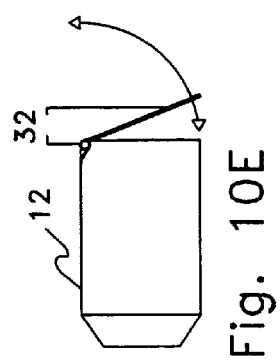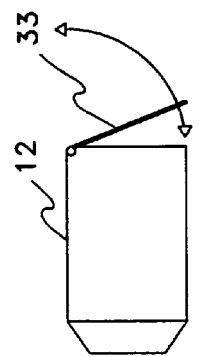

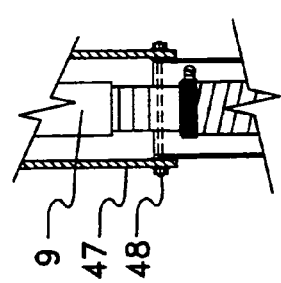
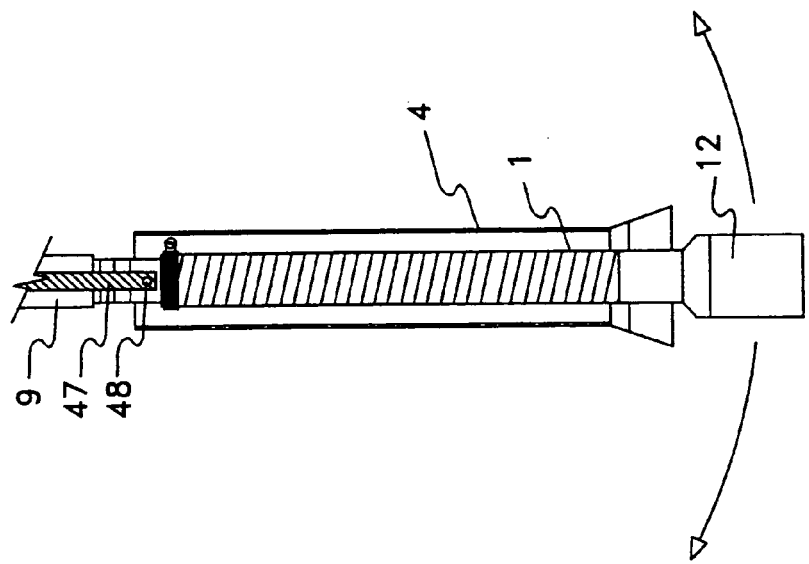
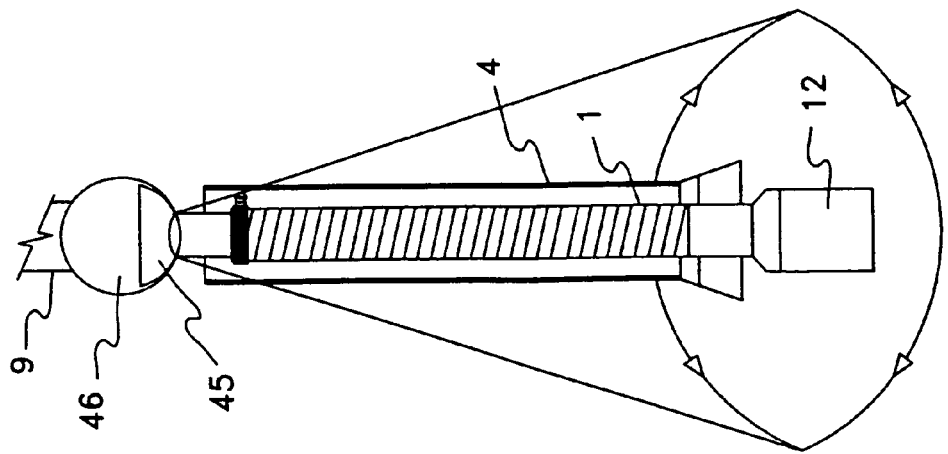

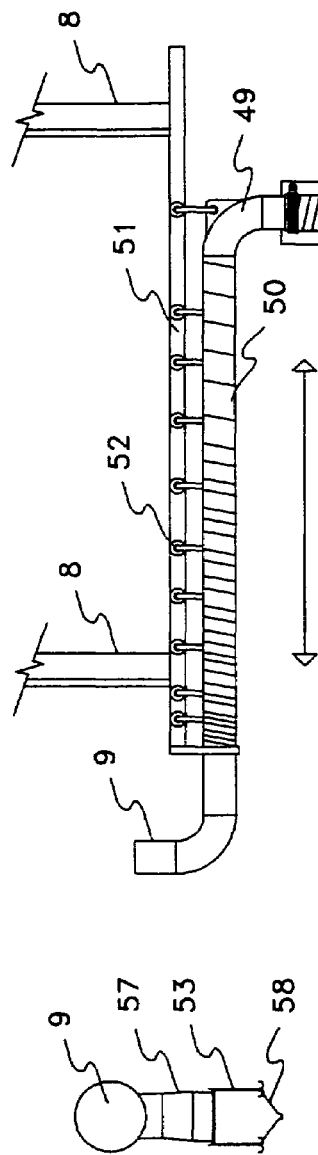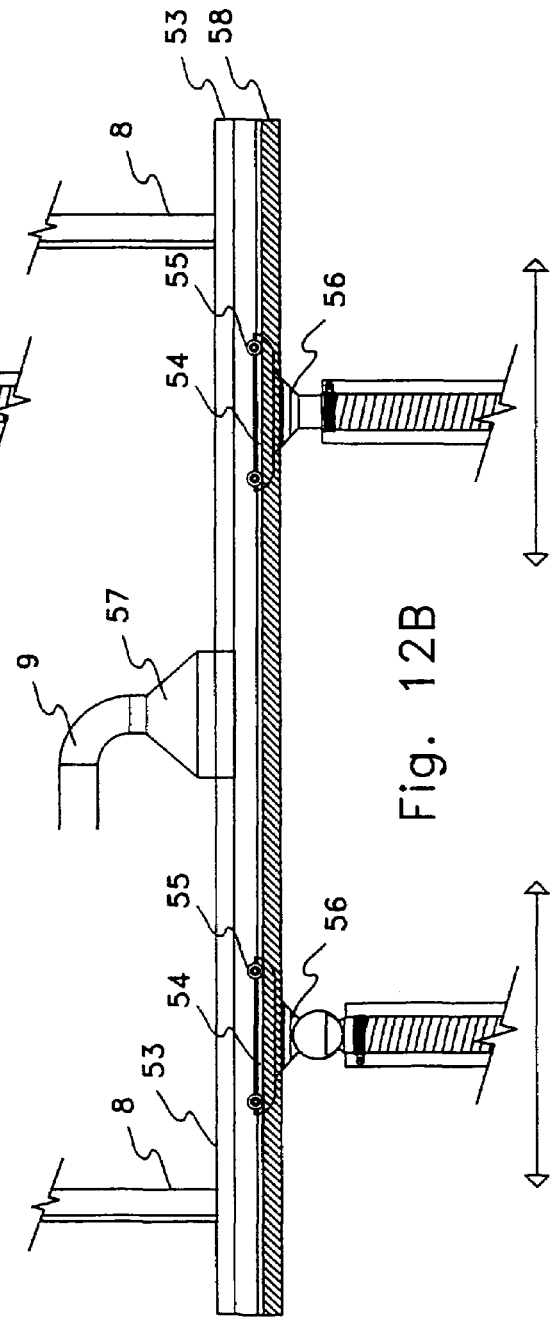
Fig. 12A
Fig. 12B
Fig. 12C

PRESSURE DIFFERENTIAL DISTRIBUTION SYSTEM

TECHNICAL FIELD

Generally, the invention relates to apparatus and methods for distributing a pressure differential between an interior volume and an exterior volume. Specifically, a pressure differential distribution system for capturing or transporting substances from a first zone to a second zone.

BACKGROUND

Movement of objects or substances on a pressure gradient along at least one path from a first zone to a second zone encompasses technology such as pneumatic tube systems, vacuum cleaning systems, emission removal systems, ventilation systems, fluid distribution systems, or the like.

Often, the use of these systems or the substances transported by them is regulated by law. Specifically, with respect to emission removal from indoor facilities, the need to remove unwanted, unhealthy or potentially lethal emissions from facilities is regulated by various federal, state, and local laws. For example, the 1996 International Mechanical Code, Section 502.11, stipulates that " . . . areas in which stationary motor vehicles are operated shall be provided with a source capture system that connects directly to the motor vehicle exhaust systems." *International Mechanical Code* (1996), hereby incorporated by reference. The presence of exhaust emissions may be detrimental to the health and well-being of persons who work in facilities in which such emissions are present. Not only may these emissions be harmful to the long-term health or well-being of persons inside the facility, but these emissions are also unpleasant or repellent to the senses. If not captured, these emissions may also attach themselves to the bodies or clothing of persons inside the facility. Furthermore, over time, the emissions may also stain the interior surfaces of the facility, causing the building to become an unattractive, malodorous, or unpleasant work environment.

Because of the convenience, health, safety, or legal concerns which can be addressed by pressure differential distribution systems there is a large commercial market for these systems. As such, numerous products have been introduced into the marketplace over the years. These various products or methods offer differing degrees of effectiveness in fulfilling the entire spectrum of substance movement, statutory, safety, or consumer requirements. However, even though a variety of devices have been introduced into the marketplace, substantial problems with existing devices remain unresolved.

A significant problem with existing pressure differential distribution devices may be that they are large or take up a lot of space. Since space in any facility is finite, it follows that different mechanical, structural, or electrical items may compete for space. The larger the pressure differential distribution device the less space that can be reserved for other uses. The large size of current devices also presents a problem for installers. If installed prior to other mechanical or electrical fixtures, a large pressure differential distribution device may present an obstacle to the installation of subsequent mechanical or electrical fixtures; on the other hand, if the emission extraction system is to be installed after other fixtures are in place, a large system may not fit as easily as a smaller one. Additionally, large devices increase shipping costs inherent in transporting a heavier item. Examples of existing large pressure differential distribution devices are disclosed by Harvey Inc., *Carbon Monoxide Exhaust Removal System*, Harvey Overhead Exhaust System, p. 6; Tykron, Inc., Vehicle Exhaust Gas Control, p. 1; Euro-Roller, Cover Picture; Fumex, *Hosereel For Exhaust Extraction*, Part No. SR 10, p. 1; Banzai, *Exhaust Hose Reels*, Exhaust Hose Reels, Cover Picture; Nederman, Inc., Spring-Loaded Exhaust Hose Reels, p. 2; Carmon Products, Inc., Car-mon Tubing Storage Reel Drawing No. 85-R1, p. 1, each of which is hereby incorporated by reference. Similarly, other types of large pressure differential distribution devices such as boom arms may furnish the consumer with the ability to swing the pressure differential distribution device along an arc, providing some mobility, however, these devices generate an operating boundary within which other objects or equipment may not typically be used. Examples of this type of large device are disclosed by Carmon Products, Inc., *Carmon Rotoboom*, RotoBoom, Drawing No. 79D5; Tykron, Inc., Swing Arm with Hose and Balancer, p. 1, each of which is hereby incorporated by reference. See also the devices disclosed by U.S. Pat. Nos. 4,086,847; 5,402,551; 5,119,843; 5,362,273; and 6,012,978, each of which is hereby incorporated by reference, as examples of large devices.

Another significant problem with existing pressure differential distribution devices may be that the various components of the device, even when in the stored position, are visually or mechanically exposed. With respect to the mechanical exposure of the device, having the components open to various types of physical mistreatment (for example, being inadvertently hit or run into) or to other environmental abuses (for example, chemical spills or spatters, or abrasives from various procedures) may lead to premature wear of the components. With respect to the visual appearance, not only may the components of the device lack pleasing aesthetics for the consumer who may purchase the device (or not if the appearance is too awkward), but also to the public to which the device may connote an unattractive image. See for example, exposed components of devices disclosed by Harvey Inc., *Carbon Monoxide Exhaust Removal System*, Harvey Overhead Exhaust System, p. 6; Tykron, Inc., Vehicle Exhaust Gas Control for Removal of Exhaust Fumes, p. 1; Euro-Roller, Cover Picture; Fumex, *Hose Reel For Exhaust Extraction*, Hose Reel, Part No. SR 10, p. 1; Banzai, Exhaust Hose Reels, Cover Picture; Nederman, Inc., Spring-Loaded Exhaust Hose Reels, p. 2; Carmon Products, Inc., Carmon Tubing Storage Reel, Drawing No. 85-R1 p. 1, each of which is hereby incorporated by reference. See also, U.S. Pat. Nos. 5,119,843; 5,402,551; 6,012,978; 4,086,847; and 5,679,072, each of which is hereby incorporated by reference, as examples of devices having exposed components.

Another significant problem with existing pressure differential distribution devices may be that they utilize an exhaust hose that features a corrugated configuration. This corrugation greatly diminishes the pressure differential generator's or exhaust fan's capacity to draw substances or emissions through the corrugated hose. The corrugation creates resistance to gas flow, thereby requiring more powerful pressure differential generator. Unfortunately, as the power of the pressure differential generator increases, it becomes more expensive to purchase and to operate. Moreover, a more powerful pressure differential generator may produce a greater amount of noise, yet another irritant to those who are in close proximity to the system. Examples of corrugated hose are disclosure by Harvey Inc., *Carbon Monoxide Exhaust Removal System*, Harvey Hose and Tubing, Part H-40-20-AF or H-50-12-AF, p. 9; Cesco-Advanced Air, Flexible Tubing, Drawing F558-305A 11/25, p. 1

(1980); and Sacatec, Inc., *Garage Exhaust—Ventilation Systems*, Drawing No. SA0286-1, p. 1, each of which hereby incorporated by reference. See also U.S. Pat. Nos. 3,911,944; and 5,791,980, each of which is hereby incorporated by reference, as examples of corrugated configurations.

Another significant problem with existing pressure differential distribution devices may be that certain hose retraction methods pose risk of injury to persons. One type of device uses a spring-activated mechanism, often called a "balancer", for hoisting the hose or terminal adapter into a stored position. This method of retrieval may be disclosed, for example, by Tykron, Inc., *Swing Arm with Hose and Balancer*, p. 1, hereby incorporated by reference. If the hose is released prematurely by the operator, the hose or adapter may sling toward an unsuspecting fellow worker, or may cause damage to any object in its trajectory, due to the fact that the hoisting mechanism may be under high-torque spring tension. This hazard is particularly serious when the adapter is constructed of metal or has protruding elements. According to a disclosure by Aero-Motive Company, *Balancer Series 10F, 15F, 10FLR & 15 FLR*, pp. 1–2, hereby incorporated by reference, improper use of a balancer mechanism "could result in serious injury, death, or property damage". See also, U.S. Pat. No. 5,679,072, hereby incorporated by reference, as an example of a device having a "balancer" component.

Another significant problem with existing pressure differential distribution devices may be that they are difficult to operate. Often existing devices have unwieldy product-to-operator interfaces which can be frustrating or annoying to the operator. Many presently offered hoses or adapters, the components of the devices which are most frequently handled by the operator, are not designed to promote ease of use. For example, high temperature hose, utilized in most military and governmental vehicle maintenance shops, historically has been made of heavy stainless steel or galvanized tubing that may be cumbersome or difficult to maneuver. It is not uncommon for the operator, frustrated with the awkwardness or clumsiness of such hoses, to abandon their use even when abandonment may result in the waste of the financial resources invested in the pressure differential distribution device, or in the possibility of adverse health ramifications. Examples of such cumbersome, stainless steel tubing are disclosed by Monoxivent Systems Inc., *Monoxivent Exhaust Elimination Systems*, Hose Assembly Order Form, p. 3; Monoxivent Systems Inc., Monoxivent Overhead Systems, p. 4; Carmon Products, Inc., *Carmon Rotoboom*, RotoBoom, Drawing No. 79D5, p. 1, Carmon Products, Inc., Carmon Overhead Disappearing Exhaust System, Drawing No. 86-D3; Cesco-Advanced Air, Flexible Tubing, Drawing No. F558-305A 11/25, p. 1, (1980), each of which is hereby incorporated by reference.

Another significant problem with existing pressure differential distribution devices may be that they do not accommodate applications in which the emission extraction system must be mobile. Hose reels, for example, are often fastened to the walls, ceiling, or fixtures of a facility and can be completely immobile. Use of the system is often confined to a radius equal to the hose length. In-floor devices are completely immobile and, once again, the length of the exhaust hose may be the limit of the area in which an in-floor system may be used. See for example, Carmon Products, Inc., Cannon RotoBoom, Rotoboom Drawing No. 79D5; and Ammerman, Inc., *Underfloor Automotive Exhaust Systems*, p. 2, each of which is hereby incorporated by reference.

Another significant problem with existing pressure differential distribution devices may be that they must be mounted with great precision or with significant structural attachment considerations, due to the larger weight of the devices. Examples are disclosed by Monoxivent Systems Inc., *Technical Information*, Monoxivent Overhead Systems, p. 4; Nederman Inc., *Overhead Exhaust Extractor*, Single and Double Extractor Fans, Drawing No. 13-2, p. 2; and Tykron, Inc., Swing Arm with Hose and Balancer, p. 1, each of which is hereby incorporated by reference.

Another significant problem with existing pressure differential distribution devices may be that the hoses hang in the way of persons. Serpentine-type devices may provide better coverage than a hose reel type device or in-floor systems, but they can be unattractive and intrusive within the facility, because their hose frequently hangs in the way of the workers. See for example, Nederman Inc., *Overhead Exhaust Extractor*, Single and Double Extractor Fans, Drawing No. 13-2, p. 2, hereby incorporated by reference. See also, U.S. Pat. Nos. 5,679,072; 5,791,980; 6,012,978; and 5,362,273, each of which is hereby incorporated by reference, as examples of "hanging hoses".

Another significant problem with existing pressure differential distribution devices may be that the exterior surfaces become hot. High temperature stainless steel or galvanized hose can be prone to becoming dangerously hot when the system moves hot substances, such as emissions from vehicles. The body of the operator, as well as that of other persons, can easily be burned from contact with the heated metal surface. Many of the existing adapters that attach to substance or emission sources may likewise be constructed of metal and thus present the same possibility of inflicting injury. Examples of devices which may become hot are disclosed by Nederman Inc., *Overhead Exhaust Extractor, Single and Double extractor Fans*, Drawing No. 13-2, p. 2; Monoxivent Systems Inc., *Technical Information*, Vehicle Exhaust Damper, Series TCA, p. 3-A; Carmon Products, Inc., Carmon Tube Assemblies, Drawing No. 86-D1, p. 1; Harvey Corp., *Carbon Monoxide Exhaust Removal System*, Harvey Components and Accessories, p. 2; Monoxivent Systems Inc., Tailpipe Adapter Order Form, p. 1; Nederman Inc., *Nozzles For Vehicle Exhaust Extraction*, Nozzles for Trucks and Other Commercial Vehicles, p. 2, each of which is hereby incorporated by reference.

Another significant problem with existing pressure differential distribution devices which are of the in-floor type may be that they do not completely retract into the floor receptacle or the floor covers may be left open. Persons working around such in-floor devices or open floor receptacles may suffer injury by tripping, or stumbling over strewn components of the emission extraction system, or suffer injury by falling into the open receptacle into which the hose enters. Moreover, the hose outlet assembly, even when operating properly with the floor receptacle closed, may often protrude above the floor surface, presenting similar hazard for those persons working around the device. See for example, Cesco-Advanced Air, *Sales Brochure*, Underfloor Disappearing with Vitrified Clay Pipe, Drawing No. F551-305A378, p. 1 (1978); Ammerman, Inc., Underfloor Automotive Exhaust Systems, Nos. 400, 601, 700, 1000-5, and 1000-6, p. 2; *Technical Manual*, Exhaust-O-Vent, p. 2 (1985); Sacatec, Inc., *Hosereel For Exhaust Extraction*, Cover, p. 1, Harvey Inc., *Carbon Monoxide Exhaust Removal System*, Harvey Overhead Exhaust System, p. 6, each of which is hereby incorporated by reference.

Another significant problem with existing pressure differential distribution devices may be that many components have hardened, protruding edges or corners or the like which can cause injury to persons. Examples of these devices are disclosed by Nederman Inc., *Overhead Exhaust Extractor*, Nederman Simple Exhaust Extractors, Drawing No. 13-2; Monoxivent Systems Inc., *Technical Information*, Vehicle Exhaust Damper, Series TCA, P. 3-A, Carmon Products, Inc., *Sales Brochure*, Carmon Tube Assemblies, Drawing No. 86-D1, p. 1; Harvey Corp., *Carbon Moxoide Exhaust Removal System*, Harvey Components and Accessories, p. 2, Monoxivent Systems Inc., Tailpipe Adapter Order Form, p. 1; Nederman Inc., *Overhead Exhaust Extractor*, Nederman Simple Exhaust Extractors, p. 2, each of which is hereby incorporated by reference. See also, U.S. Pat. No. 4,086,847, hereby incorporated by reference, as an example of a device that has "hardened, protruding edges or corners".

Another significant problem with existing pressure differential distribution devices may be that the hands of the operator may be injured if they are caught in the clamping mechanisms. Examples of devices which may pose this type of hazard are disclosed by Monoxivent Systems Inc., *Technical Information*, Vehicle Exhaust Damper, Series TCA, p. 3-A; and Nederman Inc., *Overhead Exhaust Extractor*, Nederman Simple Exhaust Extractors, p. 2, each of which is hereby incorporated by reference.

Yet another problem with existing pressure differential distribution devices may be that when multiple pressure differential distribution devices are connected to a common exhaust fan all draw or expel even when only one device may be in operation. Since many existing devices or the terminal adaptors on such devices are not equipped with a damper or closure, those devices not attached to a source of the substance to be moved will instead draw in the ambient air within the facility and move it external to the facility, or may alternately move air from external to the facility and expel it into the facility. This situation may be problematic because users of a facility may spend larger sums of money to heat or cool the ambient air within their facility. Examples of undampered or non-closured devices are disclosed by Monoxivent Systems Inc., *Technical Information Sheet*, Vehicle Exhaust Damper, Series TCA, p. 3-A; Carmon Products, Inc., *Sales Brochure*, Car-mon Tube Assemblies, Drawing No. 86-D1, p. 1; Harvey Corp., *Carbon Monoxide Exhaust Removal System*, Harvey Components and Accessories, p. 2; Monoxivent Systems Inc., Tailpipe Adapter Order Form, p. 1, each of which is hereby incorporated by reference. See also, U.S. Pat. No. 4,086,847, hereby incorporated by reference, as an example of a multiple terminal adaptor device not equipped with a damper or closure.

Still another problem with existing pressure differential distribution devices may be that existing terminal interfaces are constructed of metal which may scratch, dent, or otherwise damage the equipment to which they are attached. See for example, metal terminal interfaces disclosed by Nederman Inc., *Overhead Exhaust Extractor*, Nederman Simple Exhaust Extractors, p. 2; Monoxivent Systems Inc., *Technical Information*, Vehicle Exhaust Damper, Series TCA, p. 3-A; Carmon Products, Inc., *Sales Brochure*, Carmon Tube Assemblies, Drawing No. 86-D1, p. 1; Harvey Corp., *Carbon Monoxide Removal System*, Harvey Components and Accessories, p. 2; Monoxivent Systems Inc., Tailpipe Adapter Order Form, p. 1; Nederman Inc., *Nozzles For Vehicle Exhaust Extraction*, Nozzles for Trucks and Other Commercial Vehicles, p. 2, each of which is hereby incorporated by reference.

Another significant problem with existing pressure differential distribution devices may be premature hose failure due to high temperatures on the hose about the point of attachment to the substance or emission source. This problem can be exacerbated by restrictions that may develop in the hose at the point where it is attached to the emission port, due to the bend radius that may be required for attachment. When the hose is continually restricted, hot spots may develop on the hose which may shorten the life of the hose.

Another problem with existing pressure differential distribution devices may be that the retraction device is complicated. As disclosed by U.S. Pat. No. 5,402,551, "the input shaft is rotatably coupled to the output shaft of the motor. A clutch is disposed between the output shaft of the gear reduction unit and a vacuum hose reel". Similarly, U.S. Pat. Nos. 3,911,944; 4,343,420; and 5,146,349 disclose respectively a "reversible motor . . . switches . . . pusher disposed both in front and in the rear of the hose for actuating switches . . . auxiliary switch for manual control"; a "dual roller configuration" with a "retraction spring" wherein the hose is retracted to comprise three lengths divided by the first and second roller; "pulleys coupled to both wheels and a flexible belt . . . crossing to provide the driving connection between the first wheel and the other wheel to turn them in opposite directions . . . ". Similarly complicated are the "telescoping joints" and "counterweight means" disclosed by U.S. Pat. No. 4,086,847. This level of complexity to retract a hose, or similar component, can be understood to be problematic both with regard to potential malfunctioning of the device and with regard to maintenance of the device.

Another significant problem with existing pressure differential distribution devices may be that the devices are undifferentiated and repetitive, showing numerous incarnations of a few basic concepts and ideas, many of which have been scarcely improved since their introduction. As can be understood from the preceding list of problems and the associated body of disclosed information, that many of the above-mentioned industries that use pressure differential distribution technology have experienced long felt but unresolved needs for improved apparatus and methods. At the present time, pressure differential distribution technology suffers from a dearth of innovative ideas and methods; rather than attempting to create improved and imaginative concepts, the various industries continue to simply rely upon a few basic designs. Although some of these apparatus and methods have existed for decades, all of the above mentioned problems within the emission extraction industry remain. Some of these problems have never been addressed while other have been inadequately addressed.

As relating to pressure differential distribution technology in general, and emission extraction systems specifically, it can be understood there are an array of problems which should be addressed yet remain unresolved. The present invention addresses each the above-mentioned problems and provides practical solutions.

DISCLOSURE OF THE INVENTION

Accordingly, the present invention includes a variety of aspects which may be selected in different combinations based upon the particular application or needs to be addressed. Naturally, as a result of these several different and potentially independent aspects of the invention, the objects of the invention are quite varied.

A broad object of the invention can be to provide a pressure differential distribution system for the movement of fluids such as gases or liquids, or solids. For example, without limiting the scope of the invention, movement of air, emissions from vehicles, water, particulates, foam beads, or any substance that can be moved on a pressure gradient, either separately or in combination.

Another broad object of an embodiment of the invention can be to provide a pressure differential reaction element that moves similar amounts of substance on a pressure gradient compared to existing devices but requires less space dedicated for installation, operation, or storage.

Another broad object of an embodiment of the invention can be to provide an enclosure in which at least some components of the pressure differential distribution device can retract when not in use. One aspect of this object of the invention can be a pressure differential reaction element that retracts into an enclosure. A second aspect of this object of the invention can be to configure the exterior of the enclosure or hose holster so that it may be more aesthetically pleasing or improve the aesthetics of the facility where the device is installed.

Another broad object of an embodiment of the invention can be to make the components of the pressure differential distribution invention less complicated individually, or in combination, or with regard to how they function. An aspect of this object can be to eliminate hose reels, motors, pulleys, rollers, retraction springs, switches, telescoping joints, or the like to retract the pressure differential device or hose portion of the device.

Another broad object of an embodiment of the invention can be to lower static pressure within the pressure differential distribution device. By lowering the static pressure smaller pressure differential generators may be used to draw or expel substances moved on the pressure gradient within the device.

Another broad object of an embodiment of the invention can be to provide a pressure differential distribution device that is safe to operate. One aspect of this object of the invention can be to eliminate the risk of burning the body of the operator by designing the emission extraction system to be constructed of materials which do not become perilously hot due to contact with heated substances such as exhaust emissions. A second aspect of this object of the invention can be to prevent the pressure differential distribution system from being on the floor of the work space, obviating the possibility that operator will sustain injury by stumbling or tripping over any component. A third aspect of this object of the invention can be to eliminate the potential injuries caused by protruding, hardened components or by pinching spring-operated adapter mechanisms. A fourth aspect of this object of the invention can be to minimize the hazards of the pressure differential device or terminal-adapter from retracting in a reckless manner, or at an unsafe velocity. Specifically, one embodiment of the invention eliminates the above-mentioned "balancer" component which can be dangerous if operated improperly.

Another object of a particular embodiment of the invention can be to provide components that are not excessively heavy, unwieldy and unruly to manipulate or operate. One aspect of this object of the invention can be to eliminate the use of metal components. Yet another object of an embodiment of the invention can be to provide the consumer with an emission extraction system that can be economical in terms of operational costs. One aspect of this object of the invention is the above-mentioned reduction in static pressure. This allows gases, liquids, or solids to flow from the source of the substance to a second zone or outside exhaust vent with minimal resistance. This reduces the horsepower and electrical cost requirements of the pressure differential generator or exhaust fan. A second aspect of this object of the invention can be to utilize a damper that restricts the entry of ambient air into the system. This aspect reduces the amount of tempered air exhausted from the facility and thereby lowers energy related operational costs. A third aspect of this object of the invention can be to manufacture components from materials which will not scratch or otherwise harm the surrounding equipment and vehicles. A fourth aspect of this object of the invention can be to reduce the expense for replacement hose, caused by overheating or hose kinking.

Another object of an embodiment of the invention can be to provide a more mobile pressure differential distribution system.

Another object of an embodiment of the invention can be to eliminate hoses that hang down or protrude from the floor.

Another object of an embodiment of the invention can be to provide a terminal adaptor that has a higher degree of compatibility with various types of containers or emission sources that hold or emit the substances moved on the pressure gradient generated by the pressure differential distribution system.

Another object of embodiments of the invention can be to address the long felt but unresolved need for a pressure differential distribution system that extends or retracts in an uncomplicated manner, and also addresses the need for a smaller enclosure into which the device can be stored during periods of non-operation. The present invention fulfills this long-felt need by providing an invention which simultaneously reduces start-up or operational costs, increases ease of use, improves the safety and environmental working conditions, enhances the aesthetics of the facility, reduces energy usage, and adapts to various and unique emission applications. Each of these problems may find its solution in the present invention, and therefore the invention addresses the long felt needs of the industry and the consumer.

Naturally further objects of the invention are disclosed throughout other areas of specification and claims.

BRIEF DESCRIPTION OF THE DRAWINGS

FIG. 1 shows a particular embodiment of a pressure differential distribution system.

FIGS. 1A and 1B show particular embodiments of the pressure differential distribution system in an extended conformer (1A) and a retracted conformer (1B).

FIG. 2 shows a particular embodiment of a pressure differential reaction element having a flexible pressure differential interface and a support element.

FIG. 3 shows a particular embodiments of the invention that utilize a mechanical retraction element. FIG. 3A shows the retraction element comprising a cable attached to a spring rewind cassette. FIG. 3B shows the cable retracted by a motorized rewind cassette mechanism. FIG. 3C shows a notched cable retracted by a gear drive motor.

FIG. 4 shows particular embodiments of the invention that incorporate mechanical retraction elements incorporating a set of pulleys. FIG. 4A shows a cable that is manually lifted or lowered and is secured in the retracted position to a wall cleat. FIG. 4B shows a manual ratchet winch that provides a method to lift and lower the flexible hose. FIG. 4C shows the lifting and lowering of the flexible exhaust hose by a counterweight.

FIG. 5 shows particular embodiments of the invention which use retraction elements that utilize elasticity.

FIG. 6 shows particular embodiment of a hose holster or enclosure element. FIG. 6A shows a basic embodiment of the hose holster or enclosure element. FIG. 6B shows an end view of FIG. 6A. FIG. 6C shows a particular embodiment of the hose holster or enclosure element with a particular embodiment of a pressure differential reaction element retracted inside. FIG. 6D shows a cross section view of FIG. 6C. FIG. 6E shows a particular embodiment of a pressure differential reaction element extended from the hose holster of enclosure element. FIG. 6F shows a cross section view of FIG. 6E.

FIG. 7 shows particular embodiments of restraint elements used to hold the emission removal adapter to the self-locating hose guide or hose holster. FIG. 7A shows an restraint element that incorporates notches in the self-locating hose guide, and a pair of non-scratch tabs on the adapter. FIG. 7B shows a restraint element that utilizes permanent magnets. FIG. 7C shows an restraint element mechanism that employs a DC electromagnet. FIG. 7D shows a restraint element that incorporates a trapeze bar attachment device. FIG. 7E shows restraint element as a chain and hook.

FIG. 8 shows particular embodiments of a pressure differential distribution system enclosure or collapse element enclosure with a collapse element guide. FIG. 8A shows a side view of a collapse element guide with notches. FIG. 8B shows a top view of FIG. 8A. FIG. 8C shows an enlargement of the top view. FIG. 8D shows a side view of the collapse element guide with a permanent magnet. FIG. 8E shows a top view of FIG. 8D. FIG. 8F shows an enlargement of the top view. FIG. 8G shows a side view of the collapse element enclosure with a built-in beveled hose entry guide with notches. FIG. 8H shows a top view of FIG. 8G. FIG. 8I shows an enlargement of the top view of the internal recesses and external flares. FIG. 8J shows a side view of the collapse element enclosure with a built-in beveled hose entry guide, with notches. FIG. 8K shows a top view of FIG. 8J.

FIG. 9 shows a particular embodiment of an emission removal adaptor. FIG. 9A shows a side view of the emission removal adapter. FIG. 9B shows a front view of the emission removal adaptor. FIG. 9C shows a side view of the emission removal adapter with the rotational damper closed. FIG. 9D shows a front view of the emission removal adapter with the rotational damper in an open position.

FIG. 10 shows particular embodiments of dampers to regulate the pressure differential distribution system. FIG. 10A shows an inlet view of a damper in the closed position. FIG. 10B shows a side view of a damper in an open position. FIG. 10C shows a damper in a closed position, with a particular embodiment of a damper rotation control. FIG. 10D shows a damper blast gate in a partially opened position. FIG. 10E shows a spring operated flap damper. FIG. 10F shows a manually operated flap damper.

FIG. 11 shows particular embodiments of the invention that rotate or swing. FIG. 11A shows an internal-external ball socket support. FIG. 11B shows a side view of a bi-directional swivel support. FIG. 11C shows a front detail view of the bi-directional swivel support.

FIG. 12 shows particular embodiments of the invention that provide mobility. FIG. 12A shows a side view of a guide track with a collapse element and collapse element enclosure. FIG. 12B shows a rail with two trolleys attached to the collapse element with collapse element enclosure. FIG. 12C shows a side view of a rail.

FIG. 13 shows a particular embodiment of a terminal interface element removal adaptor.

FIG. 14 shows a particular embodiment of a terminal interface element which opens and closes under the force of a spring clamp.

FIG. 15 shows a particular embodiment of the terminal interface element or emission removal adapter with a friction enhancement surface.

MODE(S) FOR CARRYING OUT THE INVENTION

The invention provides apparatus and methods for the distribution of a pressure differential. While various examples within the description involve the extraction of unwanted or unhealthy emissions from facilities, it is understood that these examples are not meant to limit the scope of the various embodiments of the invention which may be used in a wide variety of applications such as vacuum cleaning systems, ventilation systems, fluid or solid distribution systems, or the like.

As mentioned earlier, the present invention includes a variety of aspects which may be combined in different ways. As can be easily understood, the basic concepts of the present invention may be embodied in a variety of ways. In this application, pressure differential distribution devices and methods of making and using the devices are disclosed. The methods may be disclosed as part of the results shown to be achieved by the various embodiments described or as steps which are inherent to utilization. The methods are simply the natural result of utilizing the devices as intended and described. In addition, while some devices are disclosed, it should be understood that they not only accomplish certain methods but also can be varied in a number of ways. Importantly, as to all of the foregoing, all of these facets should be understood to be encompassed by this disclosure.

As shown in FIG. 1, a particular embodiment of a pressure differential distribution device may comprise a pressure differential generator (11), and a pressure differential reaction element (collapse element, or collapsible hose depending on the particular embodiment of the invention) (1). The pressure differential generator (11) may be a fan that generates a pressure gradient within the pressure differential reaction element (1). The pressure differential generator could generate the pressure gradient in either direction within the pressure differential reaction element (1) (either creating an area of high pressure or an area low pressure within the pressure differential reaction element). In other embodiments of the invention, the pressure differential generator could be a pump, a hydraulic or pneumatic device to pressurize fluids, a bellows, or other similar device capable of generating a difference in pressure between the interior volume of the pressure differential reaction element and the exterior volume separated by the flexible pressure differential interface (2).

Figure 2B:
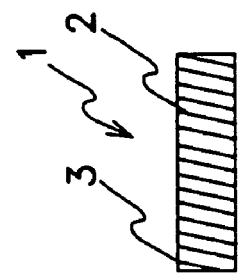
FIG. 2B shows a particular embodiment of a minimum volume conformer.
Figure 2A:
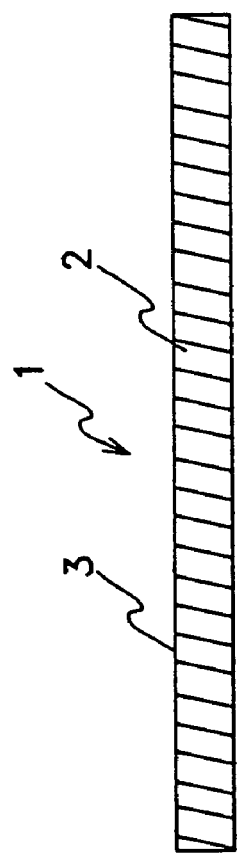
FIG. 2A shows a particular embodiment of a maximum volume conformer.

Referring now to FIG. 2, an embodiment of a pressure differential reaction element (1) is shown. The pressure differential reaction element can have a flexible pressure differential interface (2) to maintain a pressure differential between the interior volume defined by the flexible pressure differential interface (2) and the exterior volume surrounding it. With regard to some embodiments of the pressure differential reaction element invention, the flexible pressure differential interface (2) may have a construction responsive to the difference in pressure between the interior volume and the exterior volume so that the difference in pressure generated by the pressure differential generator (11) can be affirmatively used to change the conformation of the flexible pressure differential interface (2). The change in conformation in response to the difference in pressure could be to increase the volume of the pressure differential reaction element (1) or to decrease the volume of the pressure differential reaction element. The flexible pressure differential interface may be produced from a variety of materials, for example, metal foil, plastic, rubber, fiberglass, silicon impregnated fiberglass, neoprene-polyester, silicon rubber, neoprene rubber, Kevlar, glass yarn, ceramic filler, high temperature glass, or the like, independent of one another, or in combination, or as composites. The selection of materials can be made so as to make the flexible pressure differential interface tolerant of the range of pressures, the types of substances, or the range of temperatures that it may be exposed to. For example, when used to remove high temperature emissions, a material such as glass yarn may be used which can withstand an intermittent temperature of up to about 1500° Fahrenheit. A silicone impregnated fiberglass may be used for emissions having intermittent temperatures between about minus 65° Fahrenheit to about 600° Fahrenheit. Naturally, embodiments of the pressure differential interface (2) could be constructed from a plurality of layers, or could for example, have at least two layers comprising an inner layer with a surface responsive to the environment of the interior volume (temperature, chemical, pressure, or otherwise) and an outer layer with a surface responsive to the environment of the exterior volume (temperature, chemical, pressure, or otherwise). While the configuration of the embodiment of the pressure differential reaction element shown in FIG. 2 has a cylindrical geometry, it could be configured in any manner of geometries that could maintain a difference in pressure between the interior volume and the exterior volume. For example, the configuration in cross section could be any polygonal shape, or ovoid type shape, or star type shape, or could even comprise irregular geometries. Each configuration could conform in response to either a positive or negative pressure developed within the pressure differential reaction element.

The invention may also include a support element (3). The support element with respect to some embodiments of the invention may be coupled to a portion of the flexible pressure differential interface (2). The support element may be coupled to the exterior surface, as shown in FIG. 2, the interior surface, or between the layers which make up the pressure differential interface (2). The support element (3) may comprise a plurality of independent supports having closed geometry, such as circles or rectangles, or have open geometry, such as linear or arced segments, coupled to the pressure differential interface (2). The support element (3) may also have sufficient rigidity to substantially maintain a fixed configuration in response to the pressure differential between the interior volume and the exterior volume. For example, as shown in FIG. 2, the embodiment of the support element (3) shown comprises a continuous helix coupled to the exterior surface of the pressure differential interface (2). This embodiment of the support element (3) substantially fixes the diameter of the cylindrically configured pressure differential reaction element (1) in response to the difference in pressure between the interior and the exterior of the flexible pressure differential interface (2) while allowing the length of the cylindrically configured pressure differential reaction element (1) to vary as the flexible pressure differential interface (2) is conformed by the pressure difference. Naturally, based on the type of support element selected, the fixed configuration of the pressure differential reaction element may have numerous geometries as may be desired in response to varied pressure differences between the interior volume and exterior volume. For example, if the support element shown in FIG. 2 comprised a series of discontinuous arced segments, both the diameter and length of the pressure differential reaction element could be conformed at the same time, or serially, by adjusting the difference in pressure between the interior volume and the exterior volume.

The material of the support element (3) may be selected or sized based on the configuration of the pressure differential reaction element (1) desired (which could be a variety of geometries as described above), with regard to the application to which it will be used, or the environment to which the support element may be exposed. As such, the support element (3) could be made from a variety of materials such as metal, plastic, stainless steel, or plastic coil, or any material having rigidity sufficient to substantially fix the configuration of the pressure differential reaction element to the desired geometry under the force generated by the difference in pressure between the interior volume and the exterior volume. In some embodiments of the invention, the support element (3) may even comprise an increased thickness of the flexible pressure differential interface itself.

The support element (3) or support helix, as shown in FIG. 2, can be constructed of a material that arrives at a balance: it must be strong enough to give shape and support the flexible pressure differential interface (1) and, in certain applications, to assist the process of retraction; however, it must not be so strong that it pulls the emission removal adapter (12) from the emission port (10), or to cause the system to become cumbersome or unwieldy to operate.

The pressure differential reaction element (collapse element, or compressible hose) (1) can have a substantially smooth bore interior surface when in the extended configuration. As can be understood, the pressure differential interface (2), unlike corrugated hose, can conform to a substantially smooth bore surface when extended. A smooth bore surface can lower the static pressure within the pressure differential reaction element (collapse element, or compressible hose) (1).

Referring again to FIG. 1, the invention may also include an adjustable pressure differential regulator to adjust the pressure differential between the interior volume and the exterior volume defined by the pressure differential reaction element (1). The adjustable pressure differential regulator may comprise an adjustment device that monitors the difference in pressure and then adjusts the operation of the pressure differential generator (11) to maintain the difference in pressure to a predetermined range or amount. Alternately, the adjustable pressure differential regulator may maintain the difference in pressure between the interior volume and exterior volume to the predetermined value by allowing the exterior volume and the interior volume to be fluidicly responsive to a degree. An example, of this type of adjustable pressure differential regulator (or pressure differential balance element) can be the air bleed in valve (21) shown in FIG. 1. Adjustment of the pressure difference between the interior volume and the exterior volume conforms the flexible pressure differential interface (2) not coupled to the support element (3). Alternately, as shown in FIGS. 9B, 9D, 10D, 10E, and 6F the adjustable pressure differential regulator may also comprise a variably adjustable closure responsive to the pressure differential reaction element (1). Particular embodiments of the invention may also include a pressure differential selector element (17) which, as shown in FIG. 1, may comprise a damper rotation control.

The pressure differential reaction element (collapse element or compressible hose) (1) may also include embodiments that have selectably variable conformer(s) established by the pressure differential between the interior volume and the exterior volume. For example, the selectably variable conformer may conform substantially in only a single direction. For example as shown by FIGS. 1A and 1B, a pressure differential reaction element (1) having a continuous helical support element (3) may conform from an maximum volume conformer as shown in FIG. 1A (when the flexible pressure differential interface is extended) to a minimum volume conformer as shown in FIG. 1B (when the flexible pressure differential interface is folded on itself or compressed) where the change in conformation occurs substantially in a single dimension (the length of the pressure differential reaction element with respect to this embodiment of the invention). Naturally, depending on the support element (3) used it can be understood that the pressure differential reaction element could have a selectably variable conformer that conforms substantially in only two directions, or could have a selectably variable conformer that conforms in three directions, or more as the application requires. The minimum volume conformer may have a percent volume of the maximum volume conformer of less than about 5%, less than about 10%, less than about 15%, less than about 20%, less than about 25%, less than about 30%, less than about 40% or less than about 50% depending on the particular embodiment of the invention. With respect to the embodiment of the invention shown in FIG. 1, and when using a type of pressure differential reaction element (collapse element or compressible hose) similar to that shown in FIG. 2, the compression ratio of the pressure differential reaction element (1) can be from about 3:1 to about 6:1 (a 6:1 compression ration means the minimum volume conformer has a percent volume of the maximum volume conformer of about 16%). The pressure differential reaction element (1) can also have a minimum bend ratio in the range of about 1.1 times to about 1.9 times the diameter. This bend ratio can be important in preventing overheating as described below. The pressure differential reaction element (collapse element or compressible hose) (1) can have external dimensions which vary with respect to the application of the device. The embodiment of the invention shown in FIG. 1 has a diameter that is substantially consistent along the entire length of the pressure differential reaction element. The length can vary between embodiments of the invention. The length of the pressure differential reaction element shown in FIG. 1 can be between about ten feet to about fifty feet in length.

Various substances or emissions moved on the pressure differential can require various levels of air flow, commonly measured in the U.S. emission extraction industry in terms of cubic feet per minute (CFM). In practice, the CFM requirement of an application is the primary determinant of the diameter of exhaust hose to be used. When the CFM requirement is low, a smaller diameter hose may be employed; when the CFM requirement is high, a larger diameter, but more expensive, hose must be used. This observation illustrates the economic realities of the emission extraction market: more price sensitive components need to be made available to the lower CFM emission applications, while the higher CFM emission applications typically demand more robust and expensive components. Consequently, the pressure differential reaction element (collapse element or compressible hose) (1) can be available in various diameters or internal volumes to accommodate the unique economic and performance needs of a particular application. Not only should the diameter or internal volume be available in various sizes, but the pressure differential reaction element (1) must also be available in various lengths, depending upon where the emission port (or substance source) (10) may be in relation to the facility's ceiling, walls, and other relevant design considerations. Typically, embodiments of the invention can move a volume of gas within the range of about 250 CFM to about 2500 CFM.

Particular embodiments of the invention may further comprise a priority conformer memory element. The priority conformer memory element facilitates establishment of particular pressure differential reaction element conformers. The priority conformer memory element may facilitate establishment of a minimum volume conformer, or a maximum volume conformer, or a conformer used most often. The priority conformer memory element can be responsive to the flexible differential interface (2), or to the support element (3), or can be integral to, or coupled to, either or to both. For example, referring to FIG. 2, the continuous helix support element (3) shown can be provided with a priority conformer memory element so that the coils of the helix are urged together, or the coils can be urged to extend from one another to some degree.

Now referring to FIGS. 3A–C, these embodiments of the invention provide a variety of alternative devices or methods (other than the difference in pressure between the interior volume and exterior volume), to achieve retraction of the pressure differential reaction element (collapse element or compressible hose) (1). FIG. 3A offers a spring rewind cassette (60) that is mounted on the top of the hose holster (4). There is an internal cable (59) that is secured at one end on the spring rewind cassette (60) reel, and that may be attached at the other end to the emission removal adapter (3), or adapter sleeve (18). When the operator extends the flexible exhaust hose (1), the spring rewind cassette (60) leads out cable (59) from an internal cassette drum. When the operator desires to retract the flexible exhaust hose (1) into the hose holster (4), the tension on the spring rewind cassette (60) aids in the retraction of the flexible exhaust hose (1). FIG. 3B likewise utilizes a rewind cassette and cable (59); however, the rewind cassette is a motorized rewind cassette (61) and has a power supply (62). The motorized rewind cassette (61) would have upper and lower limit switches to assure that the flexible exhaust hose (1) is neither over extended nor retracted too far into the hose holster (4). Another embodiment, shown in FIG. 3C, offers a similar motorized drive; however, the cable (59) has notches or teeth that allow a gear drive motor (64) to lift and lower the flexible exhaust hose (1) as the operator activates an up or down motor controls (64). The retraction and extension of the pressure differential reaction element (collapse element or compressible hose) (1) can be accomplished when the operator activates the up or down motor control (63) function that drives the gear drive motor (64) to either extend or retract the pressure differential reaction element (1). The up or down motor control (63) may be a simple button type switch, on an flexible cable, mounted on the lower portion of the hose holster (4), or the control may be a remote transmitter, or some other type of control device may be utilized.

In addition to or in conjunction with the hose retraction or extension methods above, FIGS. 4A–C may provide embodiments at a lower cost to the consumer. FIG. 4A illustrates a method that utilizes a simple pair of pulleys (65), cable (59), and a wall cleat (66). One end of the cable (59) is secured to the emission removal adapter (12). In this particular embodiment, the cable (59) will continue up from the emission removal adapter (12), run through the interior of the flexible exhaust hose (1), and proceed through the inside of the hose holster (4) to the first pulleys of a pair of pulleys (65). The cable (59) will then proceed over to the second pulley of the pair of pulleys (65) and down to the wall cleat (66) that is attached to a wall or column and that may be easily grasped by any person within the facility. To extend the emission extraction system, the operator allows the cable (59) to slide upwards through the pair of pulleys (65), allowing the force of gravity to induce the movement of the emission removal adapter (12) out of the hose holster (4). To retract, the operator simply pulls downward on the cable (59); the pair of pulleys (65), as mentioned above, will facilitate the operator's task of retracting the flexible exhaust hose (1) into the hose holster (4). To ensure that the emission extraction system remains in a retracted position, the wall cleat (66) will be securely mounted on the wall, at a convenient height for the operator. The operator may then tie and fasten the cable (59) around the wall cleat (66) to hold the emission extraction system in the retracted position; when it becomes necessary to extend the emission extraction system, the operator may simply untie the cable (59) from the wall cleat (66).

FIG. 4B depicts a particular embodiment of the invention that utilizes a manual ratchet winch (67). This embodiment relies on the cable (59) and the pair of pulleys (65) to extend and retract the emission extraction system. However, to provide further ease of use, the operator may manually turn the manual ratchet winch (67) to raise and lower the emission extraction system. The manual ratchet winch (67) will provide the operator with leverage in the process of retraction; this benefit of leverage, coupled with the pair of pulleys (65), will make the operation of the emission extraction system less strenuous for the operator. The manual ratchet winch (67) will contain an automatic locking mechanism to ensure that the emission extraction system remains in the retracted position.

FIG. 4C shows a particular embodiment of the invention which utilizes cable (59) and the pair of pulleys (65). However, to facilitate the process of extending and retracting the emission extraction system, this embodiment relies upon a counterweight (68). The counterweight (68) will be securely fastened to the cable (59). In each particular application, the counterweight (68) will be calibrated to balance the weight of the corresponding emission removal adapter (12) and flexible exhaust hose (1), so that there may be no upward or downward movement unless the operator moves the emission extraction system.

Figure 5A:
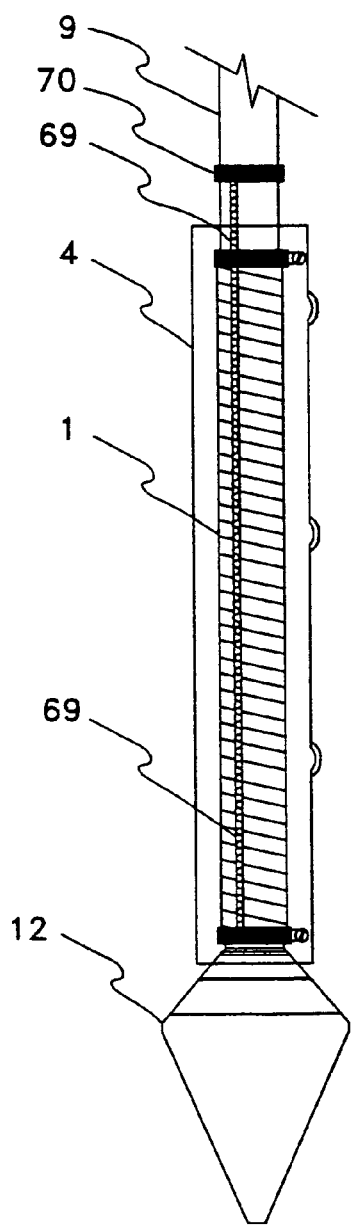
FIG. 5A shows hose retraction by a stretch cord.
Figure 5B:
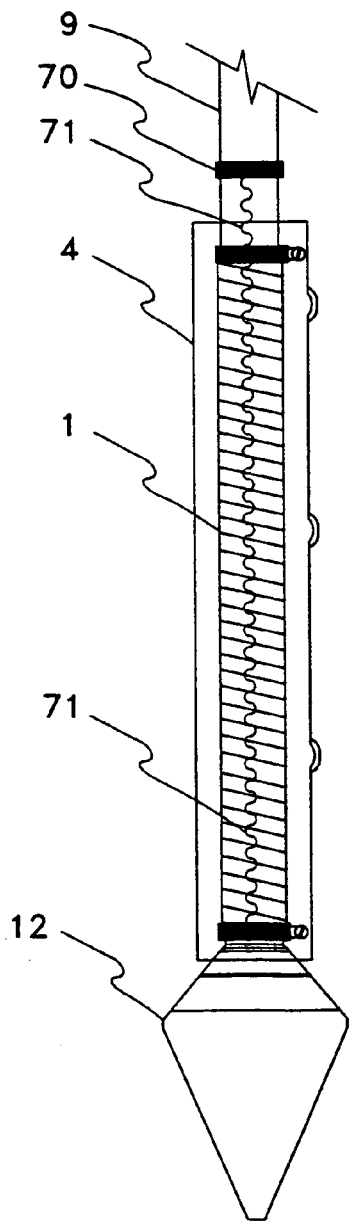
FIG. 5B shows the hose retraction accomplished by a long spring.

Now referring to FIGS. 5A–B which show particular embodiments of the invention which may be utilized individually or in combination with the above described embodiments of the invention in order to facilitate the task of extension and retraction. The overall lengths and retraction strengths of these embodiments can be selected based on the length of hose (1) and specific application requirements. As shown in FIG. 5A, the emission extraction system may include a stretch cord (69), which may be constructed of a material that contains both elastic properties and a memory. The stretch cord (69) will be securely attached to the emission removal adapter (12). From the emission removal adapter (12), the stretch cord (69) will run inside the pressure differential reaction element (collapse element or compressible hose)(1), and will proceed to a firmly secured attachment device (70) inside the lower emission duct (8). When the operator extends the emission extraction system for use, the stretch cord (69) will stretch, though it is imperative that the elasticity not be so strong that the elastic force pulls the emission removal adapter (12) from the emission port (10). Once the operator desires to retract the emission extraction system and has disengaged the emission removal adapter (12) from the emission port (10), the elastic force and compressed memory of the stretch cord (69) will assist the retraction of the flexible exhaust hose (1) into the hose holster (4). As shown in FIG. 5B, another possible embodiment of the present invention includes the utilization of a spring (71). This spring (71) will be securely attached to the emission removal adapter (12). From the emission removal adapter (12), the spring (71) will run inside the flexible exhaust hose (1), and will be firmly secured to an attachment device (70) inside the emission duct (8). When the operator extends the emission extraction system for use, the spring (71) will stretch, though it is imperative that the elasticity not be so strong that the elastic force pulls the emission removal adapter (12) from the emission port (10). Once the operator desires to retract the emission extraction system and has disengaged the emission removal adapter (12) from the emission port (10), the elastic force, and compressed memory of the spring (71) will assist the retraction of the pressure differential reaction element (collapse element or compressible hose)(1) into the hose holster (4).

Now referring to FIGS. 1 and 6, particular embodiments of the invention may also include an enclosure or a hose holster (4) responsive to the pressure differential reaction element (collapse element or compressible hose) (1). The enclosure or hose holster (4) may have an interior surface configured to receive the pressure differential reaction element in a reduced volume conformer, or can be configured to receive the minimum volume conformer. The enclosure (4) may be made from metal, or plastic, or other material which may be configured to provide an interior surface configured to receive particular embodiments of the reduced volume conformers of the pressure differential reaction element (collapse element or compressible hose)(1).

The enclosure or hose holster (4) not only acts as a receptacle for the pressure differential reaction element (collapse element or compressible hose)(1) when in the stored position, but also conceals the pressure differential reaction element (collapse element or compressible hose) (1), enhances the appearance of the facility, and protects the flexible exhaust hose (1) when not in use. By keeping the flexible exhaust hose (1) off the floor, the enclosure or hose holster (4) thereby removes a potential safety hazard. The enclosure or hose holster (4) may have support components (7), appropriate to secure the entire enclosure or hose holster assembly to a given suspension support (8) or to the exhaust duct (9). The interior configuration of the enclosure or hose holster (4) will, of course, be slightly larger than the pressure differential reaction element (collapse element or compressible hose)(1) itself, but not so large as to allow the flexible exhaust hose (1) to double back on itself when in the retracted position. The overall length of the hose holster (4) can be designed to the desired length of the pressure differential reaction element (collapse element or compressible hose) (1), the compressibility of the flexible exhaust hose, and the given application and installation requirements. The enclosure or hose holster (4) could have a variety of external configurations but the interior surface would be typically configured to match the external configuration of the retracted pressure differential reaction element (collapse element or compressible hose)(1). For example, as shown by FIG. 1 or 6, the enclosure or hose holster (4) can be cylindrical in order to match the shape of a cylindrical pressure differential reaction element (collapse element or compressible hose)(1). Examples of enclosure or hose holster (4) materials include, but are not limited to, a variety of plastics, fiberglass, or metals. The hose holster (4) can be made of a material that is strong enough to retain its shape with continuous and extended usage, but that is light enough to accommodate structural design considerations, or minimize shipping costs.

Now referring to FIG. 7, the enclosure or hose holster (4) may further comprise a self-locating hose guide (5), which may either be manufactured as a single part with the enclosure or hose holster (4), or as a separate component that is attached during installation. The primary purpose of the self-locating hose guide (5) can be to assist in the retraction of the pressure differential reaction element (collapse element or compressible hose) (1) into the enclosure or hose holster (4) and, in certain embodiments, to restrain the emission removal adapter (12) in the retracted position, as seen in FIGS. 7A–E. The size of the self-locating hose guide (5) will be determined by both the diameter of the hose holster (4) and by the size of the emission removal adapter (12) that it may secure. The material selection of the self-locating hose guide (5) would typically, but not necessarily, match the materials selected for hose holster (4), as mentioned above.

FIGS. 7A–E also provide illustrations of various apparatus to restrain the emission removal adapter (12) within a self-locating hose guide or self locator element (5) or the enclosure or hose holster (4) when the system is not in use. The self-locator element affirmatively positions the emission removal adaptor or terminal interface during periods of non-use. The self-locator guide may comprise an exterior surface of the terminal interface and a surface of the self locator guide which are configured to mate. FIG. 7A offers an embodiment in which the self-locating hose guide (5) features notches to provide a resting point for the pair of non-scratch tabs (16). As described above, the emission removal adapter (12), or adapter sleeve (18), has a pair of non-scratch tabs (16); the operator may insert these into the pair of vertical notches (23) positioned on the self locating hose guide (5). The operator may then rotate the emission removal adapter (12) slightly into the pair of horizontal, inclined notches (24), and the pair of non-scratch tabs (16), held secure by the force of gravity, rest in the pair of horizontal inclined notches (24) until the system is needed. To remove the emission removal adapter (12), the operator simply reverses the above mentioned procedure. FIG. 7B illustrates an alternative embodiment in which a permanent magnet (35), specifically selected for appropriate holding power, is secured into the self-locating hose guide (5) or hose holster (4); a corresponding metallic ring (34) is fitted onto the adapter sleeve (18) or the emission removal adapter (12). When the operator returns the emission removal adapter (12) to the self-locating hose guide (5) or hose holster (4), the permanent magnet (35) magnetically binds the metallic ring (34) into a stored position. To remove the emission removal adapter (12), the operator simply tugs on the emission removal adapter (12) until the metallic ring (34) releases from the permanent magnet (35). FIG. 8C illustrates an alternative embodiment in which a DC electromagnet (36) is secured to the self-locating hose guide (5) or hose holster (4), and a corresponding metallic ring (34) is fitted onto the adapter sleeve (18), or emission removal adapter (12). When the operator returns the emission removal adapter (12) to the self-locating hose guide (5) or hose holster (4), the DC electromagnet (36) magnetically binds the metallic ring (34) of the emission removal adapter (3) into a stored position. To remove the emission removal adapter (12), the operator simply interrupts the power to the DC electromagnet (36) by operating a conveniently located electrical switch (37). The power for the DC electromagnet (36) is supplied by a safe, low voltage DC power supply (38). FIG. 7D offers an embodiment that secures the emission removal adapter (12) with a trapeze bar (39). The trapeze bar (39) may be attached to the hose holster (4), and will be manually moved to the side by the operator when the flexible exhaust hose (1) is being extended or retracted. Once the flexible exhaust hose (1) has been retracted, the operator will simply allow the trapeze bar (39) to swing back to a vertical position, and the emission removal adapter (12) would lower itself to a resting position on the trapeze bar (39). To release the emission removal adapter (12) for usage, the operator would swing the trapeze bar (39) to the side, and the emission removal adapter (12) and the flexible exhaust hose (1) would thus be released. FIG. 7E offers an embodiment in which the emission removal adapter (12) has a length of chain (40) attached thereto. Fastened to the opposite end of the attached chain (40) is a hook (41). When the emission removal adapter (12) is retracted to a stored position, the operator may attach the hook (41) to a hole (42) in the hose holster (4). To release the emission removal adapter (12), the hook (41) is simply removed from the hole (42) in the hose holster (4). As can be understood, other apparatus to restrain the emission removal adapter (12) may be used and may either be attached to the self-locating hose guide (5), or directly to the hose holster (4).

FIGS. 8A–K offer different embodiments of the enclosure or hose holster (4), holster support components (7) or self-locating hose guides (5). FIG. 8A depicts a particular embodiment in which the hose holster (4) includes a holster support component (7) featuring a rib-like flange design, which is in turn secured to a holster support (8). A top view of the hose holster (4), the holster support component (7), and the self-locating hose guide (5) is provided in FIG. 8B. FIG. 8C shows a top view detail of the holster support component (7) with the rib-like flange bolted to an angle iron suspension support (8). Pre-drilled fastener holes in the holster support component (7) will increase the ease of installation and will reduce installation time. A different embodiment, shown in FIG. 8D, offers a hose holster (4) that includes a holster support component (7) with a tubular flange design that is secured to a suspension support (8). FIG. 8E shows a top view of the hose holster (4), the holster support component (7), and self-locating hose guide (5). FIG. 8F shows a top view detail of the holster support component (7) with the tubular flange design that receives a circular support shaft and is held secure to the holster support (8) by fasteners. Once again, pre-drilled fastener holes, in the holster support component (7), will increase the ease of installation and will reduce installation time. FIG. 8G offers a particular embodiment showing the hose holster (4) with a beveled hose entry guide (43), and a holster support component (7) with internal recesses and external flares for fastening to a suspension support (8). FIG. 8H shows a top view of the hose holster (4), and the holster support component (7). FIG. 8I shows a top view detail of the holster support component (7) with internal recessed and external flares, bolted to an angle iron suspension support (8). Pre-drilled fastener holes, in the holster support component (7), will increase the ease of installation, and will reduce the installation time. In FIG. 8J, a particular embodiment shows the hose holster (4) with a beveled hose entry guide (43), and with the hose holster (4) secured to the holster support (8) by holster support clamps (44). FIG. 8K shows a top view of the hose holster (4) and the holster support clamps (44).

Now referring to FIG. 9, the invention may further comprise an emission removal adapter (12). Just as the flexible exhaust hose (1) may be embodied in various ways embodiments of the emission removal adapter (12) may likewise be varied, depending upon the application. For example, automotive facilities, which comprise a substantial portion of the lower CFM emission removal marketplace, are generally very price sensitive. Conversely, higher CFM emission removal applications, such as heavy equipment maintenance facilities, typically demand higher performance and quality products, and these consumers are generally willing to pay the associated higher costs.

The emission removal adapter (12) serves the important function of collecting emissions at a source (10). Because the emission removal adapter (12) is the component of the system that most often will be physically handled by the operator, it is preferred that its design should promote both safety and ease of use. As shown in FIGS. 9A–D, the exterior of the emission removal adapter (12) can be constructed of a pliable material. The flexibility of this pliable material (13) can allow the emission removal adapter (12) to assume a variety of positions, enabling it to connect to a wide variety of sources or emission ports. An oval shape provided with some embodiments of the invention allows the operator to easily connect the emission removal adapter (12) not only to single, but also to a plurality of sources such as the dual emission ports, which are commonly found on higher performance vehicles.

In addition to being pliable, it is preferred that this pliable material also withstand the high temperatures of emissions. The pliable material should not substantially warp, expand, or deform relative to its original shape due to continuous contact with hot emissions. Furthermore, it is preferred that the emission removal adapter (12) be constructed from a material which may be exposed to heat for extended periods of time. Possible pliable materials include, but are not limited to, neoprene rubber, or silicone.

Figure 9C:
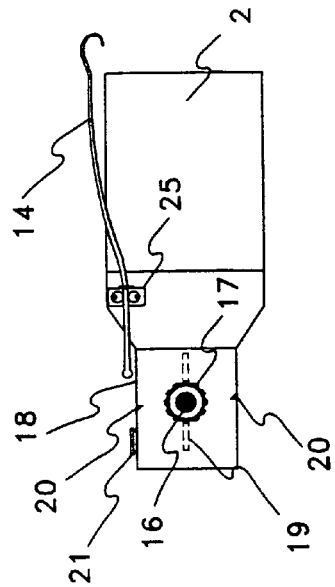
FIGS. 9A–9D show particular embodiment of an emission removal adapter with a rotational damper coupled to an adapter sleeve.
Figure 9A:
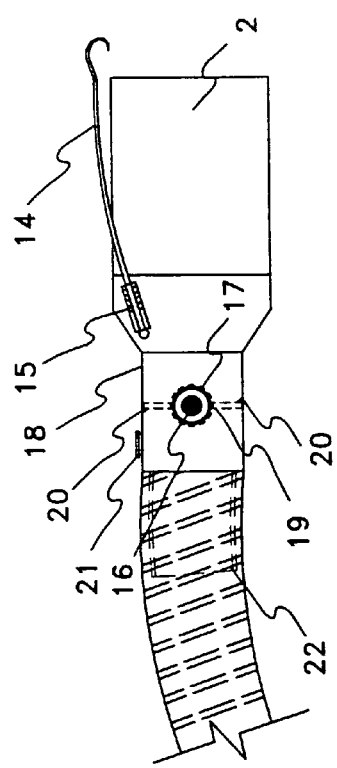
Figure 9D:
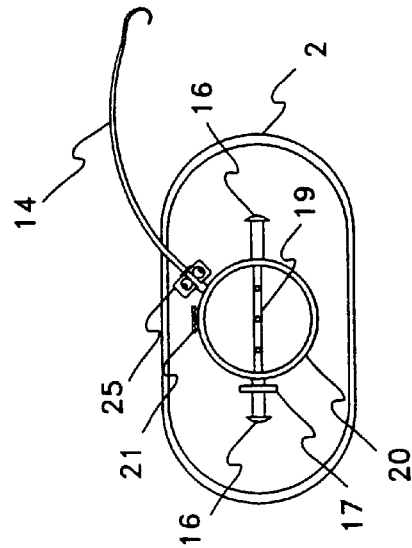
Figure 9B:
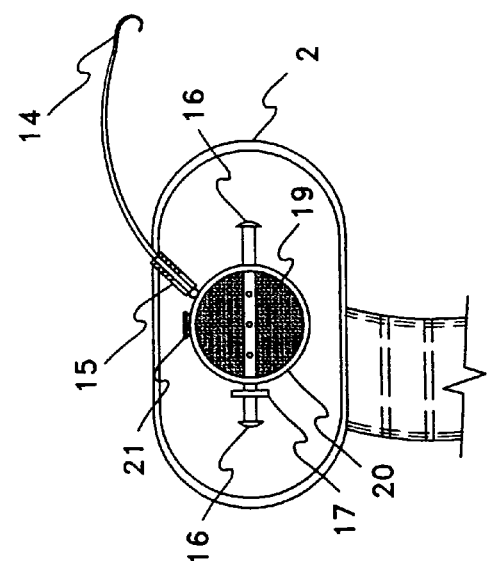

As can be readily understood, it is essential to the successful performance of certain embodiments of the invention that limited amounts substance or emissions from the emission port or substance source (10) should escape into the ambient air. By itself, the draw of air created by the operation of the exhaust fan (11) will be adequate to collect the emissions and discharge them to the outdoors. However, for emissions to be drawn effectively, it is preferred that the emission removal adapter (12) remain securely upon the emission port (10). To accomplish this aim, as shown by FIGS. 9A–D, the emission removal adapter (12) includes an adapter securing element (14), which ensures that once the operator sleeves the emission removal adapter (12) over the emission port (10), the connection remains secure. The adapter securing element (14) may be embodied as a flexible stretch cord, or as a flexible non-stretch cord. At the anterior end of the cord can be a non-scratch hook, which may be attached to a fastening point—for example, the bumper of the vehicle. As seen in FIG. 9A and FIG. 9B, the gripping cleat (15) is used to keep the cord in place. Once the operator secures the hook, he/she may grip the cord tightly, at the opposite end from the hook, and pulling the cord increasingly taut, he/she presses the cord deeper into the "V" channel of the gripping cleat (15), thereby securing not only the cord, but also the emission removal adapter (12). To remove the adapter securing element (14), the cord is loosened from the "V" channel of the gripping cleat (15), the non-scratch hook falls away, and the emission removal adapter (12) may be retracted. To keep the cord from detaching from the eyelet of the gripping cleat (15), the opposite end of the cord may be flared. The gripping cleat (15) has a built-in eyelet that prevents the cord from detaching, since the diameters of both the hook and flare ends are larger than the diameter of the eyelet. However, the diameter of the eyelet will be large enough to allow the cord to readily slide back and forth for attachment and detachment purposes. The gripping cleat (15) will typically be made from a plastic or metal mold. Also, as seen in FIG. 9C and FIG. 9D, a cam type gripping cleat (25) may serve to regulate the length and restrain the movement of the adapter securing element (14).

The shape and diameter of the emission removal adapter (12) may be different from the shape and diameter of the flexible exhaust hose (1). Therefore an adapter sleeve (18) may be used to assist in the transition of these various shapes and diameters. Additionally, the adapter sleeve (18) may provide the location for the pair of non-scratch tabs (16), the damper rotation control (17), the rotational damper (19), the damper seal ring (20), the air bleed-in valve (21), as well as place for securing the flexible protective sleeve (22). The rotational damper (19) would typically pivot on a center axis and would be positioned according to the setting of a damper rotation control (17), directly attached to the same axis. Typically the rotational damper (19) may be made from metal, though high temperature plastics may also be utilized. The damper rotation control (17) may be a dial, as shown in FIGS. 3A–D, or a lever, as shown in FIG. 10C; in either design, the damper rotation control (17) materials would be non-scratching and non-heat dispensing. To assure a seal around the rotational damper (19) perimeter, a damper seal ring (20) is located to limit air leakage. The ability to seal the air flow created by the exhaust fan (11) may be essential to assisting hose retraction, and is also needed to prevent the exhausting of ambient air out of the facility. When not in use, the rotational damper (19) may be in a closed position, as seen in FIGS. 9A–B; when in use, the rotational damper (19) would be turned to an open position, as shown in FIGS. 9C–D.

As shown by FIGS. 9A–D, the pair of non-scratch tabs (16) may be attached to the same axis that holds the rotational damper (19) and the damper rotation control (17). The purpose of the pair of non-scratch tabs (16) is to help secure the emission removal adapter (12) to the hose holster (4) or self-locating hose guide (5).

When the pressure differential generator (11) is in operation, there is a possibility, due to the negative pressure, that excessive stress may be exerted on the flexible hose (1) and the emission removal adapter (12); this potential occurrence may be obviated by the presence of an air bleed-in valve (21), as shown in FIGS. 9A–D. In applications where necessary, the air bleed-in valve (21) may relieve excessive pressure by permitting ambient air to enter the system. The air bleed-in valve (21) may, but is not limited to, operate under a spring load that is calibrated to open up when the negative pressure exceeds a predetermined threshold.

Also illustrated in FIG. 9A and FIG. 9B is a flexible, protective sleeve (22) that may be constructed of a flex-like metal or plastic material that is the same outside diameter as the adapter sleeve (18). Although this is not generally required in low emission applications, this may be particularly useful in higher temperature, higher CFM applications. This flexible, protective sleeve (22) would fit inside the lower anterior section of the flexible, exhaust hose (1). Attachment to the adapter sleeve (18), or emission removal adapter (12), may be accomplished by a variety of common manufacturing practices. In certain application, the flexible, protective sleeve (22), may protect the lower anterior end of the flexible exhaust hose (1) from potentially excessive emission temperatures and from the kinking caused by too severe a bend radius during emission port (10) attachment.

As shown in FIGS. 10A–F, the present invention may utilize a damper that may be built into an emission removal adapter (12) or the adapter sleeve (18). These include, but are not limited to, apparatus such as a rotational damper (19), a blastgate (31), a spring operated flap damper (32), a manually operated flap damper (33), or otherwise. As shown in FIGS. 10A–B, a rotational damper (19) is fitted into the adapter sleeve (18) and is manually opened or closed by a damper rotation control (17). When the dampening mechanism is placed in the closed position, it may assist in the retraction of the pressure differential reaction element (collapse element or compressible hose) (1) into the enclosure or hose holster (4) by working in conjunction with the pressure differential generator (11) to create the negative pressure required for assisting retraction. Further assisting the process of retraction, shown in FIGS. 10A–C, is a damper seal ring (20), which prevents leakage around the perimeter of the rotational damper (19), when in the closed position. In FIGS. 10A–B, a damper rotation control (17) is embodied as a dial, which the operator rotates to open or close the rotational damper (19). In FIG. 10C, the damper rotation control (17) is embodied as a lever. A dampening mechanism will be in the opened position, when the pressure differential distribution system is attached to an emission port (10), as to allow the pressure differential generator (11) to move substances such as unwanted emissions. One possible embodiment is depicted in FIG. 10D, in which a blastgate (31) is inserted into the adapter sleeve (18). To control the dampening of air, the operator manually raises and lowers the blastgate (31), thereby permitting or restricting the flow of air through the adapter sleeve (18). Another possible embodiment, shown in FIG. 10E, includes the use of a spring operated flap damper (32), which is located at the mouth of the emission removal adapter (12). Yet another possible embodiment is shown in FIG. 10F, in which a manually operated flap damper (33) is placed on the mouth of the emission removal adapter (12). As can be understood, other air dampening components may alternatively be used.

In certain applications, it may be desirable to provide added mobility to the emission extraction system. To accomplish this aim, FIGS. 11A and 11B show embodiments that allow a fixed mounted system to offer limited movement. FIG. 11A shows an pressure differential distribution system suspended from a ball socket support, which consists of an internal ball-socket support (45) that fits inside an external ball-socket support (46). The internal ball-socket support (45) directly supports the pressure differential distribution system, while the external ball-socket support (46) is directly supported to the heavy gauge exhaust duct (9). The external ball-socket support (46) has a cutout in its lower hemisphere to accommodate the internal ball-socket support (45) rotational movement. This particular embodiment provides the user with limited rotational movement, offering improved system coverage and the ability to move the pressure differential distribution system when required. The particular embodiment of FIG. 1B shows an pressure differential distribution system that gains mobility via a bi-directional swivel support (47). FIG. 11C offers a front detail of the connection area, showing the emission extractor system to be supported by a single holster-swivel support pin (48) that is fastened to the bi-directional swivel support (47). This particular embodiment provides the user with back and forth movement, offering enhanced coverage and the ability to swing the emission extraction system out of the path of interfering objects.

Now referring to FIG. 12, a pressure differential manifold (9) can be joined between the pressure differential generator (11) and a plurality of pressure differential reaction elements (1). The pressure differential generator would be sized to properly operate all the plurality of pressure differential reaction elements depending on the application and size as would be known to those skilled in the art.

In certain applications, it may be desirable move the emission extraction system along an extended linear path. The ability to move the system along a track may be especially important in applications in which the emission port(s) are changing locations intermittently. Furthermore, the ability to transport the emission extraction system along a track may allow the consumer to reduce expense by utilizing one emission extraction for multiple bays, rather than purchasing separate systems for each bay. In order to accomplish this, FIGS. 12A and 12B show embodiments that allow an pressure differential distribution system(s) to have extended linear movement. FIG. 12A depicts a particular embodiment of an pressure differential distribution system that is suspended from a vertical to horizontal support elbow (49), that is in turn hung from a guide track (51) by an undercarriage to guide track support (52). A collapsible hose (50), which may have the same properties and specifications as the flexible exhaust hose (1), connects at one end to the vertical to horizontal support elbow(49) and at the other end to the exhaust duct (9). The undercarriage to guide track support (52) allows both the collapsible hose (50) and the vertical to horizontal support elbow (49) to glide back and forth on the guide track (51). Consequently, the emission extraction system may be easily transported anywhere along the length of the guide track (51). The entire assembly is suspended by attaching the guide track (51) to suspension support (8). As seen in FIG. 12B, a particular embodiment of the invention offers one or more pressure differential distribution systems to be suspended from a common emission plenum rail (53). The emission plenum rail (53) would typically be utilized in applications that demand multiple emission extraction systems, and require longer linear coverage area than the guide track (51) can provide. FIG. 12B shows both a fixed-mounted and a ball-and-socket mounted emission extraction system, attached to an emission trolley (54) by a trolley adapter (56). The entire emission trolley assembly moves back and forth along the emission plenum rail (53) on trolley wheels (55). Depending on the design and application requirements, the emission plenum rail (53) may have one or more rail to duct adapters (57) that transfer the emissions to the exhaust duct (9). In FIG. 12C, a side view of the rail is shown, indicating that a pair of pliable air sealing flaps (58) may be used to assure that emissions do not escape the emission plenum rail (53), when the emission trolley (54) is moved along its length.

Figure 13A:
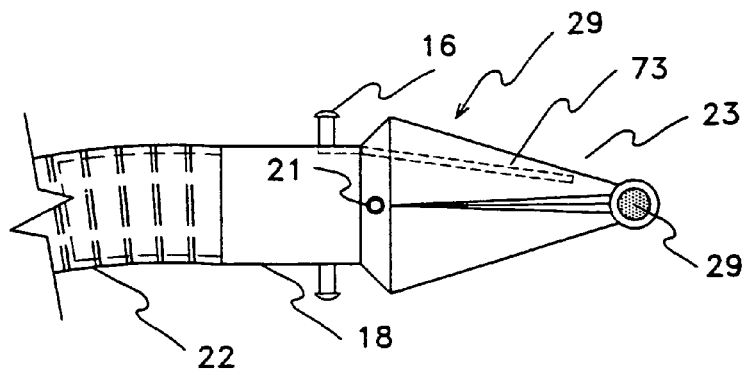
FIG. 13A shows a side view of the terminal interface element in a closed position.
Figure 13B:
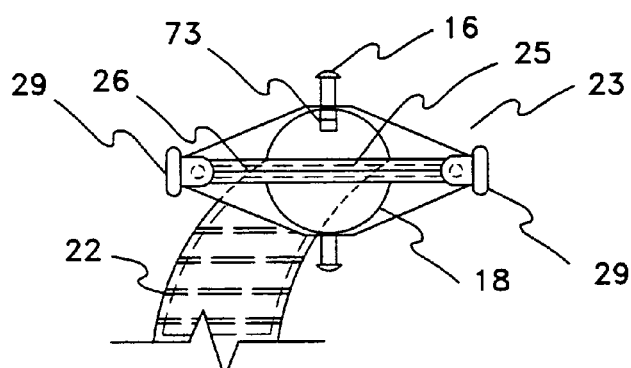
FIG. 13B shows a front view of the terminal interface element in a closed position.
Figure 15A:
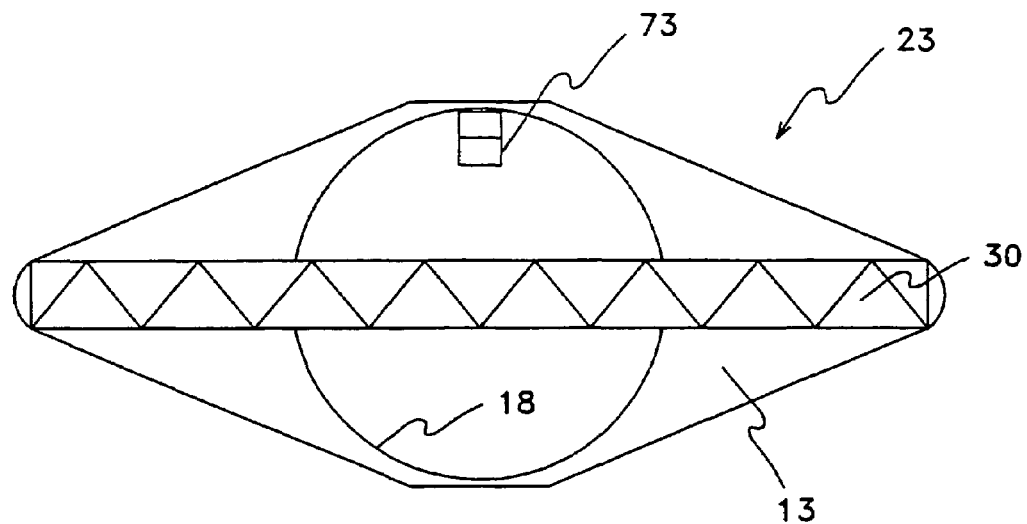
FIG. 15A shows a front view of the emission removal adapter and the friction enhancement surface in a closed position.
Figure 15B:
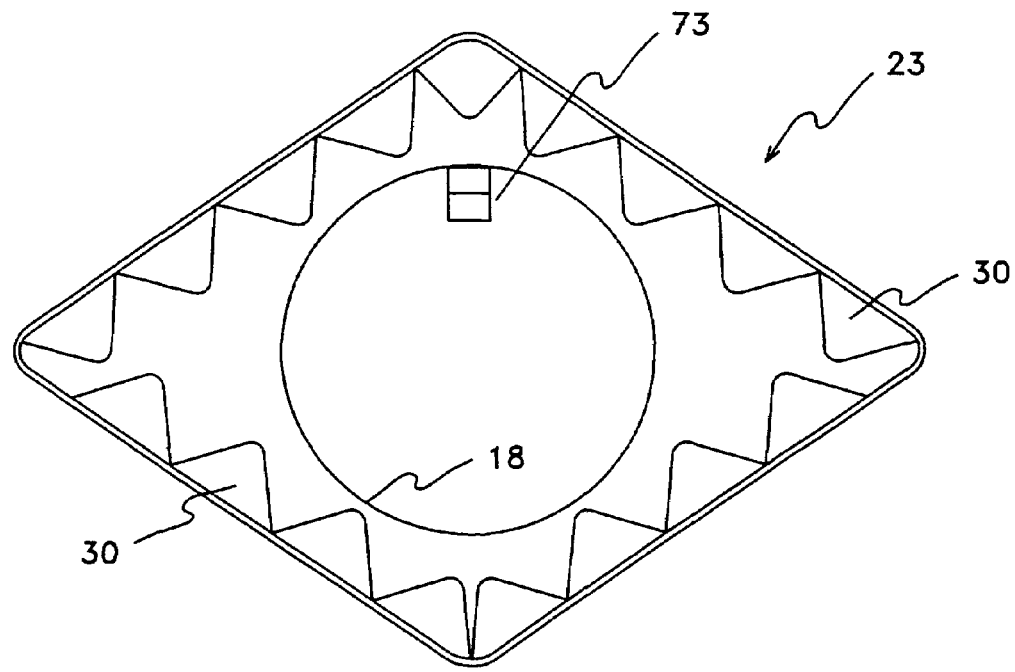
FIG. 15B shows a front view of the emission removal adapter and the friction enhancement surface in an open position.

FIGS. 13A–D show a particular embodiment of the invention having a terminal interface element (23). This embodiment of the invention may comprise a variably adjustable aperture element (26), where the variably adjustable aperture element coordinates a location of a first pair of axes (27) on a first plane of movement with a location of a second pair of axes (28) on a second plane of movement. An adaptor element (18) coupled to the pressure differential reaction element (collapse element or compressible hose)(1), and a body (29) responsive to the variably adjustable aperture element (26) and the adaptor element (18). As can be understood, the first pair of axes on the first plane of movement and the second pair of axes on the second plane of movement can be hingedly responsive to each other. When one pair of axis moves it may necessitate the movement of the second pair of axes on the second plane of movement and vice versa. Axes may broadly encompass flexible seams in the body of the terminal interface element or may even encompass a deflection apex in the material of the body. The variably adjustable aperture element may further comprise an aperture seal to minimize the flow of air through the terminal interface when not in use. A pressure differential regulator may maintain a consistent pressure differential regardless of the size of the variably adjustable aperture element. As shown by FIG. 13B, the sides of the variably adjustable aperture element (26) may rest against one another, creating a tight seal. Thus, while the emission extraction system is not in operation, all terminal interface elements (23) may remain tightly shut due to the variably adjustable aperture element (26). The terminal interface element (23) may also include an aperture position memory element (25) responsive to the variable adjustable aperture element (26). For example, this may involve self-closing or self opening features. The self-closing feature of the variably adjustable aperture element (26) may serve as a damper to assist in the retraction of the pressure differential reaction element (or collapse element or compressible hose)(1) by the vacuum created by the pressure differential generator (11), can prevent the draw of ambient air from the facility, or can secure the terminal interface element (23) or emission removal adapter (12) to the emission port (10). There is an array of possible mechanisms to provide an aperture position memory element to self-close the variably adjustable aperture element; these include, but are not limited to, a pair of torsion springs, a pair of band springs, or a memory-molded rubber or plastic product. The mouth closure element (26) may have a closure memory to remain in a closed position, as shown in FIGS. 13A and 13B. The interior of the body may be configured to mate with a source of the substance to be moved by the pressure differential between the interior volume and the exterior volume. One example of this may be embodied as a tongue (73) responsive to the interior surface of the body which is configured to fit in or around particular shaped emission or substance source hardware. A friction enhancement surface may be coupled to the interior surface of the body or on the surfaces of the variably adjustable aperture element. This may consist of an applied material with a textured surface, or the interior of the body or the variable adjustable aperture element may have a textured surface. Naturally, any surface feature which improves the grip of the terminal interface to the source would be a friction enhancement feature such as the interdigitated teeth show by FIGS. 15A and 15B.

Figure 13C:
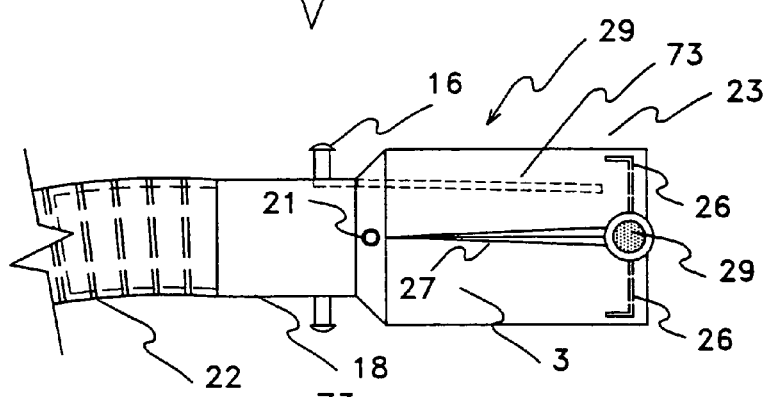
FIG. 13C shows a side view in which the terminal interface element is in an open position.
Figure 13D:
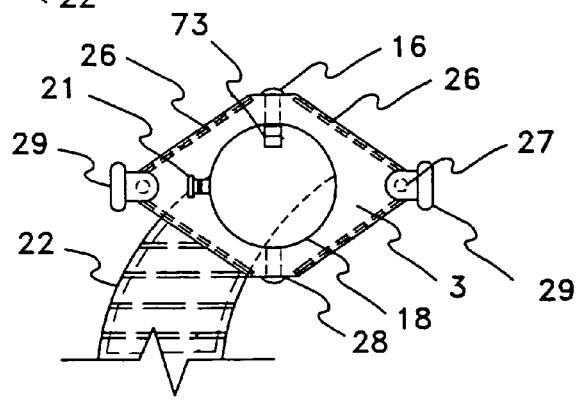
FIG. 13D shows a front view of the terminal interface element in an open position.

When the pressure differential distribution system is to be placed into operation, the operator may open the variably adjustable aperture element (26) of the terminal interface element (23) by placing their hands on each side of the variably adjustable aperture element (26) and by pushing both side towards each other, exerting force against the resistance of the variably adjustable aperture element (26) or aperture position memory element (25). Under the pressure of the operator, the variably adjustable aperture element (26) can assume an open position, as shown in FIGS. 13C–D. With the variably adjustable aperture element (26) in an open position, the operator may easily slide the variably adjustable aperture element (26) over the emission port (10). By releasing pressure on the sides of the variably adjustable aperture element (26), the aperture position memory element (25) of the variably adjustable aperture element (26) may cause the variably adjustable aperture element (26) to attempt to return to a closed position. Consequently, the mouth of the variably adjustable aperture element (26) will tighten and clench around the emission port (10), and will stay in place until the operator releases the variably adjustable aperture element (26) by reversing the procedure.

Other possible embodiments, shown in FIGS. 13A–D, include a pair of push-grip knobs (29), attached to the variably adjustable aperture element (26). The pair of push-grip knobs (29) would typically be constructed of a scratch resistant, non-heat transferable material. A flexible seam (27) which runs the length of both sides of the body of the terminal interface element (23) may provide enhanced flexibility at specific locations on the terminal interface element (23).

Figure 14A:
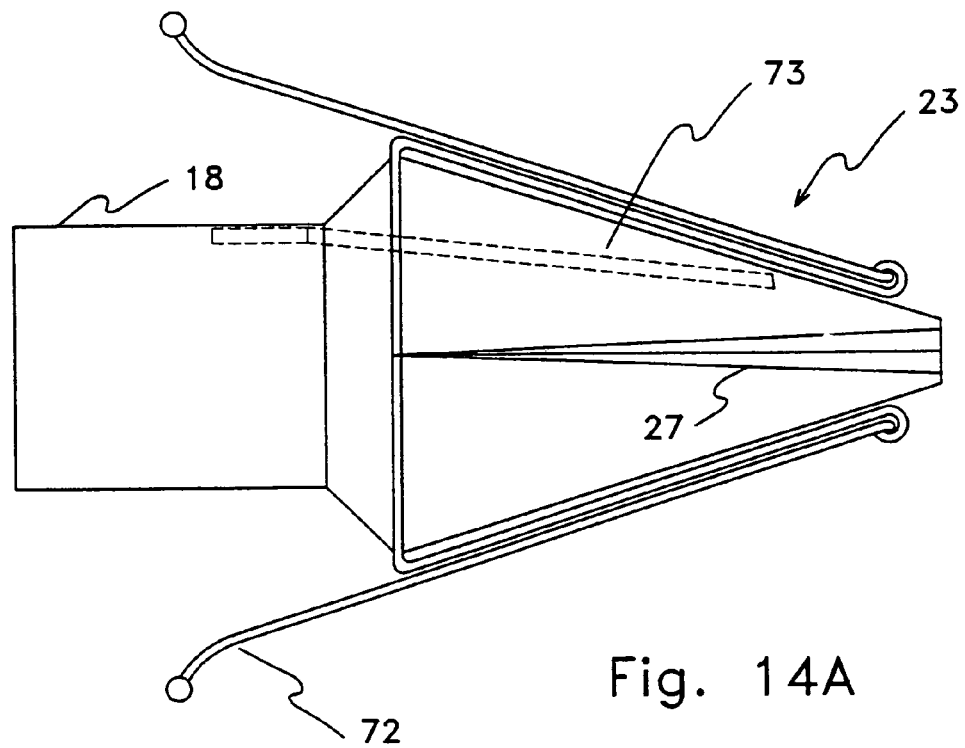
FIG. 14A shows a side view of the emission removal adapter in a closed position.
Figure 14B:
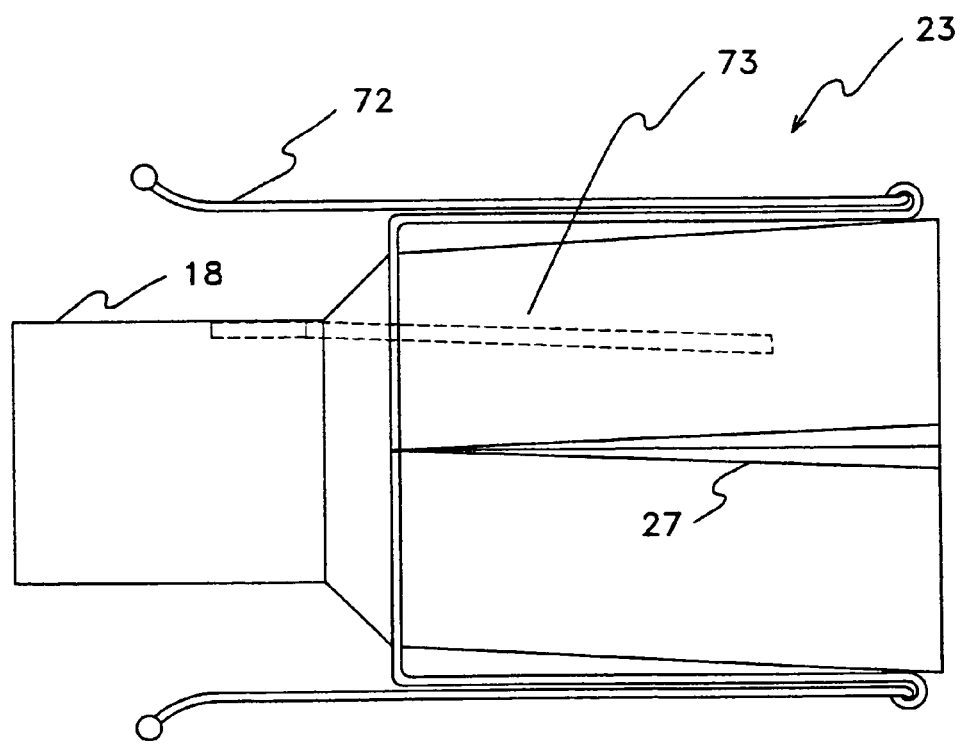
FIG. 14B shows a side view of the emission removal adapter in an open position.

As can be seen in FIGS. 14A–B, other possible embodiments are available to close the variably adjustable aperture element (26). In this particular embodiment, a spring clamp (72) is attached to the variably adjustable aperture element (26) and provides the necessary force to close the mouth, as seen in FIG. 14A. By pushing the handles together, the operator may open the emission removal adapter (12) into an open position, as seen in FIG. 14B. In the closed position, the ends of the curved handles will facilitate the same purpose as the pair of non-scratch tabs (16).

To allow the variably adjustable aperture element (26) to better fasten to the emission port (10), one embodiment of the present invention provides for a friction enhancement surface (30) in the mouth of the variably adjustable aperture element (26), as shown in FIG. 14A and FIG. 14B. A possible example of a friction enhancement surface (30) may be interdigitating expanded surface areas, by which the variably adjustable aperture element (26) will form a tight seal when in the closed position, as depicted in FIG. 14A. When the variably adjustable aperture element (26) is in the open position, as seen in FIG. 14B, the friction enhancement surface (30) may grab and clench onto the emission port (10), thus ensuring that the variably adjustable aperture element (26)), once engaged, will remain securely attached to the emission port (10). In this embodiment, the variably adjustable aperture element (26) will have a closure memory of its own, facilitated by the selection of the material's physical characteristics. Because of this built-in closure memory, no spring type mechanism would be required to close the variably adjustable aperture element (26).

As can be easily understood from the foregoing, the basic concepts of the present invention may be embodied in a variety of ways. It involves both emission removal techniques as well as devices to accomplish the appropriate emission removal. In this application, the emission removal techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this provisional application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims which will be included in a full patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for the full patent application. It should be understood that such language changes and broad claiming will be accomplished when the applicant later (filed by the required deadline) seeks a patent filing based on this provisional filing. The subsequently filed, full patent application will seek examination of as broad a base of claims as deemed within the applicant's right and will be designed to yield a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "holster" should be understood to encompass disclosure of the act of "holstering"—whether explicitly discussed or not—and, conversely, were there only disclosure of the act of "holstering", such a disclosure should be understood to encompass disclosure of a "holster" and even a means for "holstering" Such changes and alternative terms are to be understood to be explicitly included in the description.

Any references mentioned, including but not limited to federal or state statutes, patents, publications, brochures, marketing materials, or inter-net pages, in this patent application, are hereby incorporated by reference or should be considered as additional text or as an additional exhibits or attachments to this application to the extent permitted; however, to the extent statements might be considered inconsistent with the patenting of this/these invention(s) such statements are expressly not to be considered as made by the applicant. Further, the disclosure should be understood to include support for each feature, component, and step shown as separate and independent inventions as well as the various combinations and permutations of each.

In addition, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible in countries such as Australia and the like. Such terms are intended to have an inclusive meaning rather than an exclusive one and should be interpreted in their most expansive form so as to afford the applicant the broadest coverage legally permissible. Therefore, in countries such as Australia and the like, such terms are not intended to have an exclusive, or more limited meaning.

Thus, the applicant(s) should be understood to claim at least: i) each of the pressure differential distribution systems as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, and x) the various combinations and permutations of each of the elements disclosed.

We claim:

1. A method of distributing a pressure differential comprising the steps of:
   a. collapsing a flexible pressure differential interface with the assistance from a repositionable closure element that creates an airflow restriction when moved to a closed position, wherein a portion of said flexible differential interface is coupled to a support element, and wherein said flexible pressure differential interface establishes an interior volume and an exterior volume, and wherein said support element has sufficient rigidity to maintain a substantially fixed configuration in response to a pressure differential between said interior volume and said exterior volume; and
   b. establishing a minimum volume conformer of said pressure differential interface, wherein said minimum volume conformer collapses into an enclosure having an interior volume configured to receive said minimum volume conformer.

2. A method of distributing a pressure differential as described in claim 1, wherein collapsing a flexible pressure differential interface comprises collapsing said flexible pressure differential interface with a pressure differential between said interior volume and said exterior volume separated by said flexible pressure differential interface.

3. A method of distributing a pressure differential as described in claim 2, further comprising the step of selecting a volume of said flexible pressure differential interface, wherein said volume is selected by adjusting said pressure differential between said interior volume and said exterior volume.

4. A method of distributing a pressure differential as described in claim 3, further comprising the step of establishing a maximum volume conformer.

5. A method of distributing a pressure differential as described in claim 4, wherein said step of establishing a minimum volume conformer of said pressure differential interface comprises establishing a minimum volume conformer having a percent volume of said maximum volume conformer selected from the group consisting of less than 5%, less than 10%, less than 15%, less than 20%, less than 25%, less than 30%, less than 40%, and less than 50%.

6. A method of distributing a pressure differential as described in claim 5, wherein said step of establishing a minimum volume conformer having a percent volume of said maximum volume conformer comprises variably adjusting conformation of said flexible pressure differential interface with said pressure differential between said interior volume and said exterior volume substantially in one dimension.

7. A method of distributing a pressure differential as described in claim 6, which further comprises the step of facilitating establishment of said minimum volume conformer with a priority conformer memory element.

8. A method of distributing a pressure differential as described in claim 7, wherein said step of facilitating establishment of said minimum volume conformer with a priority conformer memory element comprises coupling said memory element to said flexible pressure differential interface.

9. A method of distributing a pressure differential as described in claim 8, wherein said step of facilitating establishment of said minimum volume conformer with a conformer memory element comprises coupling said memory element to said support element.

10. A method of distributing a pressure differential as described in claim 9, further comprises the step of balancing said pressure differential between said interior volume and said exterior volume to maintain a consistent pressure differential.

11. A method of distributing a pressure differential as described in claim 10, wherein said step of coupling a portion of said flexible pressure differential interface to a support element having sufficient rigidity to maintain at least a minimum volume conformer in response to said difference in pressure between said interior volume and said exterior volume comprises coupling a plurality of independent supports to said flexible pressure differential interface.

12. A method of distributing a pressure differential as described in claim 10, wherein said step of collapsing a flexible pressure differential interface, wherein a portion of said flexible differential interface is coupled to a support element, and wherein said flexible pressure differential interface establishes an interior volume and an exterior volume, and wherein said support element has sufficient ridgity to maintain a substantially fixed configuration in response to a pressure differential between said interior volume and said exterior volume comprises coupling a continuous helix to said flexible pressure differential interface.

13. A method of distributing a pressure differential as described in claim 11 or 12, further comprises the step of establishing said minimum volume conformer within a minimum volume conformer enclosure.

14. A method of distributing a pressure differential as described in claim 13, further comprises the step of coupling a terminal interface element to said pressure differential reaction element.

15. A method of distributing a pressure differential as described in claim 14, wherein said step of coupling a terminal interface element to said pressure differential reaction element comprises coupling a first pair of axis on a first plane of movement and a second pair of axis on a second plane of movement, whereby said first pair of axis on said first plane of movement and said second pair of axis on said second plane of movement are hingedly responsive.

16. A method of distributing a pressure differential as described in claim 15, further comprising the step of coordinating a location of said first pair of axis on said first plane of movement by adjusting a location of said second pair of axis on said second plane of movement to variably adjust an aperture.

17. A method of distributing a pressure differential as described in claim 16, further comprising the step of maintaining a consistent difference in pressure between said interior volume and said exterior volume separated by said flexible pressure differential interface independent of aperture size.

18. A method of distributing a pressure differential as described in claim 17, further comprising the step of coupling said terminal interface to a source of a substance.

19. A method of distributing a pressure differential as described in claim 18, further comprising the step of moving said substance with said pressure differential between said interior volume and said exterior volume.

20. A pressure differential distribution device, comprising:
  a. a pressure differential generator;
  b. a compressible hose coupled to said differential generator, wherein said compressible hose has an interior surface and an exterior surface, and wherein said compressible hose has a supporting helix joined to a portion of said exterior surface, and wherein said compressible hose has an extended configuration and a compressed configuration;
  c. a repositionable closure hose retraction element responsive to said hose; and
  d. a hose holster having an interior volume configured to receive said compressible hose wherein said compressible hose is assisted in retraction by said repositionable closure hose retraction element by creating an airflow restriction when moved to a closed position.

21. A pressure differential distribution device as described in claim 20, wherein said supporting helix joined to said portion of said exterior surface has a cylindrical configuration.

22. A pressure differential distribution device as described in claim 21, wherein said supporting helix joined to said portion of said exterior surface comprises a material selected from the group consisting of stainless steel, galvanized steel, and plastic coil stock.

23. A pressure differential distribution device as described in claim 20, wherein said interior surface of said compressible hose has a substantially smooth bore interior surface when in said extended configuration.

24. A pressure differential distribution device as described in claim 20, wherein said extended configuration and said compressed configuration have a minimum compression ratio from about 3 to 1 to about 6 to 1.

25. A pressure differential distribution device as described in claim 20, wherein said compressible hose has a minimum bend ratio within the range of about 1.1 to about 1.9 times the diameter.

26. A pressure differential distribution device as described in claim 20, 21, 22, 23, or 24, wherein said compressible hose has an internal diameter selected to handle airflow volumes within the range of about 250 cubic feet per minute to about 2500 cubic feet per minute.

27. A pressure differential distribution device as described in claim 26, wherein said compressible hose has a substantially consistent internal diameter along the entire length.

28. A pressure differential distribution device as described in claim 27, wherein said compressible hose has a substantially consistent external diameter along the entire length.

29. A pressure differential distribution device as described in claim 28, wherein said compressible hose has a length within the range of about 10 feet to about 50 feet.

30. A pressure differential distribution device as described in claim 29, wherein said flexible hose comprises a material selected from the group consisting of silicon impregnated fiberglass, neoprene-polyester, silicon rubber, neoprene rubber, Kevlar, glass yarn, ceramic filler, and high temperature glass.

31. A pressure differential distribution device as described in claim 30, wherein said flexible hose has a tolerance to temperatures up to about 1500° Fahrenheit intermittent.

32. A pressure differential distribution device as described in claim 20, further comprising a protective sleeve coupled to at least a portion of said interior surface of said compressible hose.

33. A pressure differential distribution device as described in claim 31, wherein said hose holster comprises a material selected from the group consisting of plastic, fiberglass, or metal.

34. A pressure differential distribution device as described in claim 20, further comprising a hose entry guide coupled to said holster.

35. A pressure differential distribution device as described in claim 34, further comprising a holster mount assembly.

36. A pressure differential distribution device as described in claim 35, wherein said holster mount assembly is selected from the group consisting of a fixed mount, a pivot mount, and a moveable track mount.

37. A pressure differential distribution device as described in claim 20, further comprising an emission removal adaptor.

38. A pressure differential distribution device as described in claim 37, further comprising a emission removal adaptor restraining element.

39. A pressure differential distribution device as described in claim 38, wherein said emission removal adaptor restraining element comprises a pair of non-scratch tabs coupled to said emission removal adaptor, and wherein said non-scratch tabs are configured to insert into a pair of substantially vertical notches and then rotate into a pair of substantially horizontal notches.

40. A pressure differential distribution device as described in claim 20, and further comprising a spring rewind cassette.

41. A pressure differential distribution device as described in claim 20, wherein said spring rewind cassette is motorized.

42. A pressure differential distribution device as described in claim 20, wherein said hose retraction element comprises a pressure differential between said interior surface and said exterior surface of said compressible hose.

43. A pressure differential distribution device as described in claim 37, wherein said emission removal adaptor has a mouth, wherein said mouth coordinates a location of a first pair of axes on a first plane of movement with a location of a second pair of axes on a second plane of movement, and wherein said first pair of axes on said first plane of movement and said second pair of axes on said second plane of movement are hingedly responsive.

44. A pressure differential distribution device as described in claim 43, wherein said first pair of axes comprise flexible seams.

45. A pressure differential distribution device as described in claim 44, wherein said second pair of axes comprise flexible seams.

46. A pressure differential distribution device as described in claim 44, wherein said second pair of axes comprise a deflection apex.

47. A pressure differential distribution device as described in claim 43, further comprising a body joined to said mouth of said emission removal adaptor.

48. A pressure differential distribution device as described in claim 47, further comprising a tongue responsive to said body.

49. A pressure differential distribution device as described in claim 48, further comprising a mouth closure element coupled to said mouth.

50. A pressure differential distribution device as described in claim 49, wherein said mouth closure element is selected from the group consisting of a pair of torsion springs, a pair of band springs, a memory molded rubber, and a memory molded plastic.

51. A pressure differential distribution device as described in claim 50, wherein said mouth closure element has mouth open memory.

52. A pressure differential distribution device as described in claim 51, wherein said mouth closure element has mouth closed memory.

53. A pressure differential distribution device as described in claim 49, further comprising a friction enhancement surface coupled to said mouth.

54. A pressure differential distribution device as described in claim 53, further comprising a friction enhancement surface coupled to an interior surface of said mouth.

55. A pressure differential distribution device as described in claim 54, wherein said friction enhancement surface comprises interdigitated teeth.

56. A pressure differential distribution device as described in claim 53, further comprising grip knobs fixed to an exterior surface of said emission removal adaptor, wherein said grip knobs are responsive to said mouth.

57. A pressure differential distribution device as described in claim 56, further comprising an adaptor sleeve joined between said emission removal adaptor and said compressible hose.

58. A pressure differential distribution device as described in claim 57, wherein said repositionable closure hose retraction element comprises damper rotationally coupled to said adaptor sleeve.

59. A pressure differential distribution device as described in claim 58, further comprising a pressure differential manifold.

60. A pressure differential distribution device as described in claim 59, wherein said pressure differential manifold further comprises a ball socket.

* * * * *